United States Patent
Nagase et al.

(10) Patent No.: US 10,288,305 B2
(45) Date of Patent: May 14, 2019

(54) VENTILATION APPARATUS

(71) Applicant: Panasonic Intellectual Property Management Co., Ltd., Osaka (JP)

(72) Inventors: Tetsuya Nagase, Aichi (JP); Toshikazu Yoshizawa, Aichi (JP); Hiroyuki Kanou, Aichi (JP); Shingo Takenawa, Aichi (JP); Tsuraki Nakajima, Aichi (JP); Masahiro Yamaguchi, Aichi (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 765 days.

(21) Appl. No.: 14/766,879

(22) PCT Filed: Feb. 20, 2014

(86) PCT No.: PCT/JP2014/000871
§ 371 (c)(1),
(2) Date: Aug. 10, 2015

(87) PCT Pub. No.: WO2014/129189
PCT Pub. Date: Aug. 28, 2014

(65) Prior Publication Data
US 2015/0377504 A1 Dec. 31, 2015

(30) Foreign Application Priority Data

Feb. 25, 2013 (JP) ................. 2013-034194
Feb. 25, 2013 (JP) ................. 2013-034197
(Continued)

(51) Int. Cl.
*F24F 7/08* (2006.01)
*F24F 11/00* (2018.01)
(Continued)

(52) U.S. Cl.
CPC .......... *F24F 11/0001* (2013.01); *F24F 7/007* (2013.01); *F24F 7/08* (2013.01);
(Continued)

(58) Field of Classification Search
CPC ........ F24F 11/0001; F24F 11/77; F24F 11/30; F24F 7/007; F24F 7/08; F24F 7/10;
(Continued)

(56) References Cited

U.S. PATENT DOCUMENTS 5,282,770 A * 2/1994 Shibata ..................... F24F 7/08
454/239
5,705,734 A * 1/1998 Ahmed ................ F24F 11/0001
73/1.35
(Continued)

FOREIGN PATENT DOCUMENTS

CN 101737893 6/2010
CN 101975433 2/2011
(Continued)

OTHER PUBLICATIONS

English Translation of Chinese Search Report dated Apr. 19, 2017 for the related Chinese Patent Application No. 201480010416.X.
(Continued)

*Primary Examiner* — Gregory L Huson
*Assistant Examiner* — Dana K Tighe
(74) *Attorney, Agent, or Firm* — Panasonic IP Management; Kerry S. Culpepper

(57) ABSTRACT

A first ventilation apparatus of ventilation apparatuses which form a ventilation system includes: a first information transmission part (18a); a first information reception part (19a); and a first control part (17a). The first control part (17a) includes: a first total ventilation air volume determination part (20a); a first-ventilation-apparatus first air volume decision part (21a); and a first air volume detection part (22a).

6 Claims, 17 Drawing Sheets

(30) Foreign Application Priority Data

Feb. 25, 2013 (JP) .................................. 2013-034200
Aug. 5, 2013 (JP) .................................. 2013-162104

(51) Int. Cl.

| | |
|---|---|
| F24F 7/007 | (2006.01) |
| F24F 7/10 | (2006.01) |
| F24F 11/30 | (2018.01) |
| F24F 11/77 | (2018.01) |
| F24F 110/20 | (2018.01) |
| F24F 110/70 | (2018.01) |
| F24F 110/72 | (2018.01) |
| F24F 120/10 | (2018.01) |
| F24F 130/30 | (2018.01) |
| F24F 11/56 | (2018.01) |

(52) U.S. Cl.

CPC .............. *F24F 7/10* (2013.01); *F24F 11/30* (2018.01); *F24F 11/77* (2018.01); *F24F 11/56* (2018.01); *F24F 2110/20* (2018.01); *F24F 2110/70* (2018.01); *F24F 2110/72* (2018.01); *F24F 2120/10* (2018.01); *F24F 2130/30* (2018.01)

(58) Field of Classification Search

CPC .... F24F 11/56; F24F 2110/20; F24F 2110/70; F24F 2110/72; F24F 2120/10; F24F 2130/30
USPC .................................................. 454/259, 239
See application file for complete search history.

(56) References Cited

U.S. PATENT DOCUMENTS

| | | | | |
|---|---|---|---|---|
| 6,848,623 | B2* | 2/2005 | Weimer | F24F 11/0001 236/11 |
| 7,669,433 | B2* | 3/2010 | Yoon | F24F 3/06 62/231 |
| 7,766,734 | B2* | 8/2010 | Dietz | F24F 11/0001 454/345 |
| 2004/0185770 | A1* | 9/2004 | Soeholm | F23N 3/002 454/239 |
| 2005/0287945 | A1* | 12/2005 | Choi | F24F 7/08 454/234 |
| 2009/0261767 | A1* | 10/2009 | Butler | F04D 27/004 318/445 |
| 2012/0224976 | A1* | 9/2012 | Nagamatsu | G06F 1/206 417/1 |
| 2015/0050876 | A1 | 2/2015 | Sakai et al. | |

FOREIGN PATENT DOCUMENTS

| | | |
|---|---|---|
| CN | 104160216 A | 11/2014 |
| JP | 5-018573 | 1/1993 |
| JP | 6-026678 | 2/1994 |
| JP | 6-300341 | 10/1994 |
| JP | 2000-146268 | 5/2000 |
| JP | 2000-274791 | 10/2000 |
| JP | 2001-306155 | 11/2001 |
| JP | 2002-267219 | 9/2002 |
| JP | 2003-056879 | 2/2003 |
| JP | 2004-069121 | 3/2004 |
| JP | 3722907 B | 11/2005 |
| JP | 2006-038364 | 2/2006 |
| JP | 2007-139336 | 6/2007 |
| JP | 2007-333363 | 12/2007 |
| JP | 2010-117111 | 5/2010 |
| JP | 4506334 B | 7/2010 |
| JP | 2011-137595 | 7/2011 |
| JP | 2012-251730 | 12/2012 |
| KR | 2006107243 | 10/2006 |
| WO | 2007/058260 | 5/2007 |

OTHER PUBLICATIONS

International Search Report of PCT application No. PCT/JP2014/000871 dated Apr. 28, 2014.
English Translation of Chinese Search Report dated May 11, 2016 for the related Chinese Patent Application No. 201380013206.1.

* cited by examiner

| FLOOR PLAN SETTING (m²) | TOTAL VENTILATION AIR VOLUME (m³/h) |
|---|---|
| NOT MORE THAN 150 | 150 |
| 151 TO 300 | 170 |
| 301 TO 450 | 190 |
| 451 TO 600 | 210 |
| 601 TO 750 | 230 |
| NOT LESS THAN 751 | 250 |

| AIR VOLUME SETTING | OUTSIDE AIR VOLUME (m³/h) |
|---|---|
| SMALL | 50 |
| INTERMEDIATE | 100 |
| LARGE | 150 |
| TURBO | 200 |

VENTILATION APPARATUS

TECHNICAL FIELD

The present invention relates to a ventilation apparatus.

BACKGROUND ART

A ventilation apparatus which forms a conventional ventilation system for controlling a discharge air volume has the following configuration.

Specifically, when a range hood is driven during 24-hour ventilation operation of a bathroom ventilation apparatus, a 24-hour ventilation function of the bathroom ventilation apparatus is stopped or a ventilation air volume is decreased. Further, when a current sensor detects stopping of a range hood fan, the 24-hour ventilation operation of the bathroom ventilation apparatus is restarted or restoration and increase of a discharge air volume are performed (refer to PTL (Patent literature) 1, for example).

As other patent literatures relating to the present application, PTLs 2 and 3 are listed.

CITATION LIST

Patent Literatures

PTL 1: Unexamined Japanese Patent Publication No. 2006-38364
PTL 2: Japanese Patent No. 3722907
PTL 3: Japanese Patent No. 4506334

SUMMARY OF THE INVENTION

The above-mentioned conventional ventilation apparatus, by making use of its function of adjusting a ventilation air volume, has prevented occurrence of a phenomenon where opening of a door becomes difficult due to generation of a negative pressure inside a building or occurrence of a phenomenon where a sound generated by air passing through a gap becomes large.

With respect to drawbacks that such a ventilation apparatus has, when a failure occurs in a motor or the like for discharging a large volume of air, such as a motor of a range hood fan, the 24-hour ventilation operation is stopped, thus leading to a possibility that the ventilation becomes insufficient. A large-air-volume ventilation by a range hood or the like brings about excessive ventilation and hence, an air volume more than necessary is ventilated. This large-air-volume ventilation wastefully consumes electric power and, at the same time, gives discomfort to a user.

In view of this circumstance, the present invention provides a ventilation apparatus installed inside a house, and forming a ventilation system with other ventilation apparatuses connected through a single system of information transmission network for maintaining a ventilation air volume in the house constant. The ventilation system includes n sets of the ventilation apparatuses designated as a first ventilation apparatus to an nth ventilation apparatus where n is an integer of 2 or more. The first ventilation apparatus includes: a first information transmission part configured to transmit information to the second ventilation apparatus to the nth ventilation apparatus through the information transmission network; a first information reception part configured to receive information on the second ventilation apparatus to the nth ventilation apparatus, through the information transmission network; and a first control part configured to decide operation of the first ventilation apparatus. The first control part includes: a first total ventilation air volume determination part configured to determine a total ventilation air volume necessary for the house; and a first-ventilation-apparatus first air volume decision part configured to decide a first-ventilation-apparatus target air volume necessary for maintaining the total ventilation air volume based on the information on the second ventilation apparatus to the nth ventilation apparatus received by the first information reception part. The first control part further includes a first air volume detection part configured to detect a first-ventilation-apparatus output air volume which the first ventilation apparatus actually outputs, and, when the first-ventilation-apparatus output air volume differs from the first-ventilation-apparatus target air volume, the first air volume detection part inform the second ventilation apparatus to the nth ventilation apparatus of the first-ventilation-apparatus output air volume as a preferential air volume, through the first information transmission part. The mth. ventilation apparatus, where m is any of integers that satisfy 2≤m≤n, includes: an mth information transmission part configured to transmit information to the first ventilation apparatus to the (m−1)th ventilation apparatus and the (m+1)th ventilation apparatus to the nth ventilation apparatus through the information transmission network. The mth ventilation apparatus also includes: an mth information reception part configured to receive information on the first ventilation apparatus to the (m−1)th ventilation apparatus and the (m+1)th ventilation apparatus to the nth ventilation apparatus, through the information transmission network; and an mth control part configured to decide operation of the mth ventilation apparatus. The mth control part includes: an mth total ventilation air volume determination part configured to determine the total ventilation air volume; and an mth-ventilation-apparatus first air volume decision part configured to decide an mth-ventilation-apparatus target air volume necessary for maintaining the total ventilation air volume based on the information on the first ventilation apparatus to the (m−1)th ventilation apparatus and the (m+1)th ventilation apparatus to the nth ventilation apparatus received by the mth information reception part. The mth control part also includes: an mth air volume detection part configured to detect an mth-ventilation-apparatus output air volume which the mth ventilation apparatus actually outputs, and, when the mth-ventilation-apparatus output air volume differs from the mth-ventilation-apparatus target air volume, the mth air volume detection part inform the first ventilation apparatus to the (m−1)th ventilation apparatus and the (m+1)th ventilation apparatus to the nth ventilation apparatus of the mth-ventilation-apparatus output air volume as a preferential air volume, through the mth information transmission part.

In such ventilation apparatuses, information on a total ventilation air volume necessary for the control parts of the respective ventilation apparatuses, and information on preferential air volumes of the respective ventilation apparatuses are shared in common by performing bidirectional communication through information transmission parts and information reception parts of the respective ventilation apparatuses. Air volumes of the respective ventilation apparatuses are decided based on such information and hence, even when a plurality of ventilation apparatuses are installed in a house, a ventilation air volume necessary for the whole house is maintained at an optimum value so that an energy loss due to an excess of the ventilation air volume can be reduced.

DESCRIPTION OF EMBODIMENT

Hereinafter, exemplary embodiments of the present invention are described with reference to the drawings.

First Exemplary Embodiment

Figure 1:
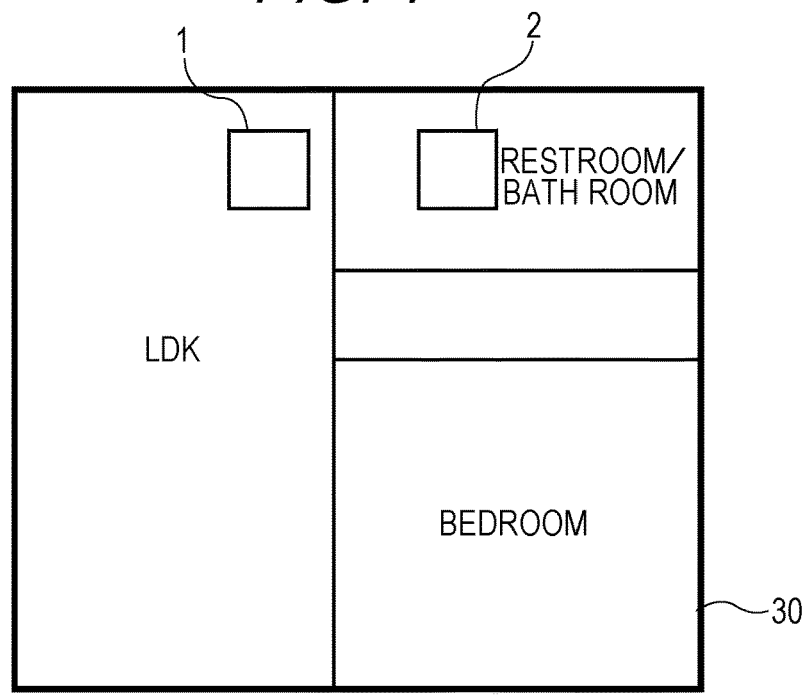
FIG. 1 is a view showing an installation example of a ventilation system constituted of ventilation apparatuses of a first exemplary embodiment of the present invention.

FIG. 1 is a view showing an installation example of a ventilation system constituted of ventilation apparatuses of a first exemplary embodiment of the present invention. In this exemplary embodiment, the case is assumed where two ventilation apparatuses having the same specification including a prescribed air volume capacity of 150 [m$^3$/h] are installed in house 30 having a total floor area of 200 [m$^2$]. Assume that the respective ventilation apparatuses are first ventilation apparatus 1 and second ventilation apparatus 2. Assume that first ventilation apparatus 1 is installed in LDK (living room, dining room and kitchen), and second ventilation apparatus 2 is installed in a restroom/bath room. Further, a ventilation system maintains a ventilation air volume in house 30 at a fixed value.

The ventilation system of the first exemplary embodiment of the present invention is described with respect to the case where the ventilation system is constituted of first ventilation apparatus 1 and second ventilation apparatus 2. The case where the ventilation system is constituted of three or more ventilation apparatuses is also described when appropriate. Constitutional elements of first ventilation apparatus 1 and constitutional elements of second ventilation apparatus 2 are equal to each other and hence, the description is made by taking first ventilation apparatus 1 as an example with reference to FIG. 2 to FIG. 13. A part indicated by symbol affixed with "a" (18a, for example) in first ventilation apparatus 1 is described by the same symbol affixed with "b" (18b, for example) in the second ventilation apparatus, and is described by the same symbol affixed with "m" (18m, for example) in the mth ventilation apparatus.

Figure 2:
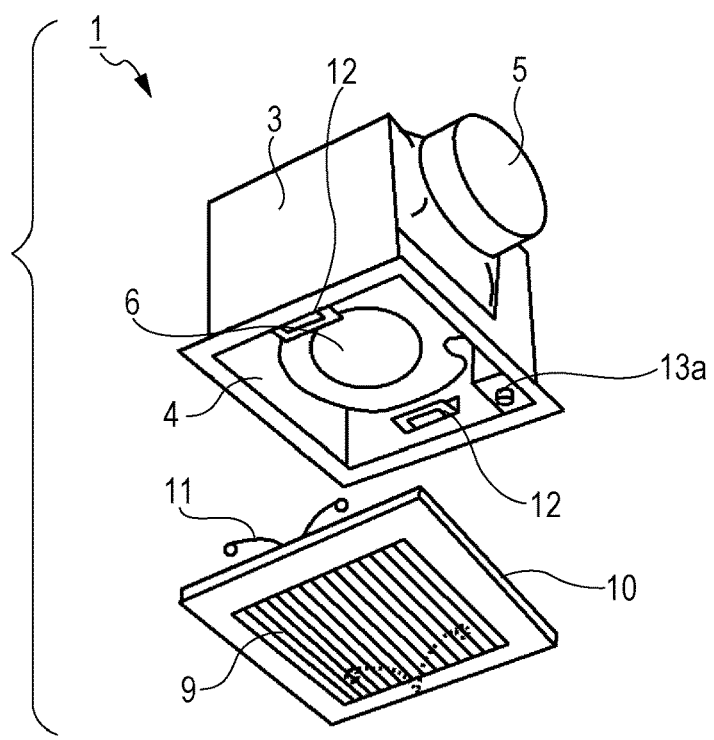
FIG. 2 is an exploded perspective view of the ventilation apparatus.

FIG. 2 is an exploded perspective view of the ventilation apparatus of the first exemplary embodiment of the present invention. As shown in FIG. 2, body case 3 of first ventilation apparatus 1 has a box shape where indoor air intake opening portion 4 is formed on a lower surface of body case 3 and indoor air discharge opening portion 5 is formed on a side surface (or an upper surface) of body case 3, and blower 6 is disposed inside body case 3.

Figure 3:
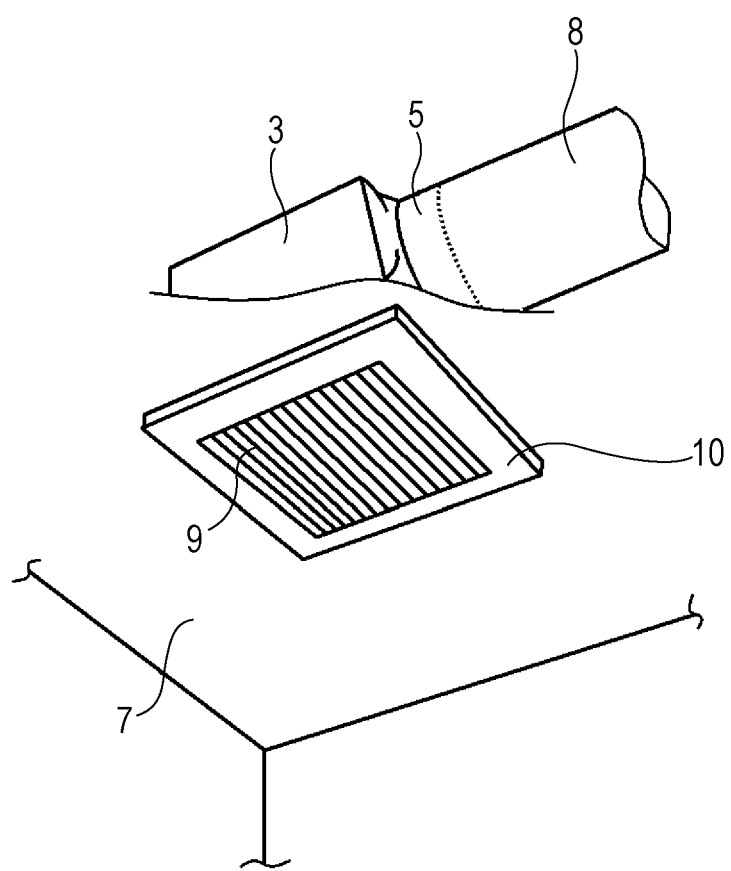
FIG. 3 is a partially cut-out perspective view showing an installation example of the ventilation apparatus.

FIG. 3 is a partially cut-out perspective view showing the installation example of the ventilation apparatus of the first exemplary embodiment of the present invention. As shown in FIG. 3, body case 3 is installed on an upper surface of ceiling plate 7. An opening portion (not shown) having an approximately same size as indoor air intake opening portion 4 shown in FIG. 2 is formed in ceiling plate 7.

One end of duct 8 is connected to indoor air discharge opening portion 5, and the other end of duct 8 extends to the outside of the house. Decorative plate 10 having slit-like ventilation holes 9 which covers indoor air intake opening portion 4 shown in FIG. 2 from a lower surface of ceiling plate 7 is detachably mounted on body case 3.

Decorative plate 10 is mounted on body case 3 by a well-known structure. To simply describe the mounting structure, decorative plate 10 is easily mounted on body case 3 by fitting mounting springs 11 of decorative plate 10 in mounting portions 12 of body case 3 as shown in FIG. 2. Decorative plate 10 is larger than indoor air intake opening portion 4 in size. Accordingly, decorative plate 10 covers an opening portion (not shown) formed in ceiling plate 7 shown in FIG. 3, or indoor air intake opening portion 4 from a lower surface side of ceiling plate 7 so that an aesthetic feeling is increased.

Further, as shown in FIG. 2, first temporary total ventilation air volume setting part 13a is disposed on decorative plate 10 at a position where decorative plate 10 can be detachably mounted and a user can easily observe and operate first temporary total ventilation air volume setting part 13a. First temporary total ventilation air volume setting part 13a sets a temporary total ventilation air volume which house 30 shown in FIG. 1 is required to have.

Figures 4A, 4B:
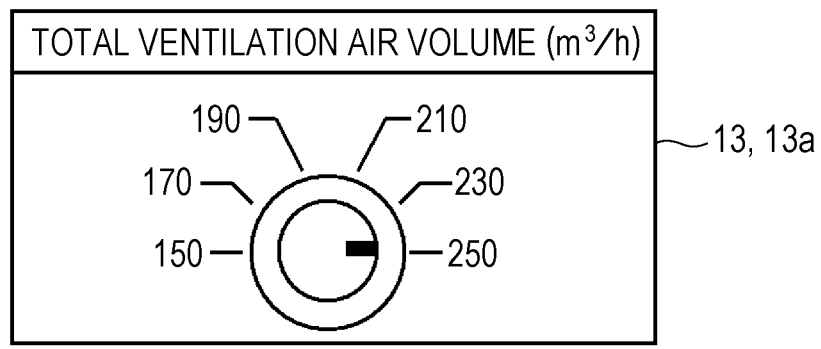
FIG. 4A is an external appearance view showing a total ventilation air volume setting part of the ventilation apparatus.
FIG. 4B is a table showing the correlation between a floor area and an air volume acquired by the total ventilation air volume setting part of the ventilation apparatus.

FIG. 4A is an external appearance view showing a total ventilation air volume setting part of the ventilation apparatus of the first exemplary embodiment of the present invention, and FIG. 4B is a table showing the correlation between a floor area and an air volume acquired by the total ventilation air volume setting part of the ventilation apparatus. A value set by first temporary total ventilation air volume setting part 13a shown in FIG. 4A is not limited to total ventilation air volume Q which house 30 shown in FIG. 1 is required to have, and may be a set value based on which a total ventilation air volume can be uniquely decided. In this exemplary embodiment, the reason "temporary" is used is as follows. That is, as described later, total ventilation air volumes Q are respectively set by temporary total ventilation air volume setting parts 13 provided in the plurality of ventilation apparatuses and hence, a process for deciding one total ventilation air volume Q in house 30 shown in FIG. 1 is required lastly.

An example of a method of inputting a temporary total ventilation air volume by temporary total ventilation air volume setting part 13 includes a method where the temporary total ventilation air volume is set based on a total floor area of house 30. In the construction industry, an air volume which a building is required to have is generally decided based on a floor area of the building. As shown in FIG. 4B, total ventilation air volume Q necessary for house 30 shown in FIG. 1 is defined corresponding to a floor plan. Alternatively, as a method of inputting a temporary total ventilation air volume by temporary total ventilation air volume setting part 13, temporary total ventilation air volume Q(n) (n being symbol indicative of ventilation apparatus) may be directly inputted.

As shown in FIG. 4A, a rotary dial type switch by which a set value can be set at multiple stages is provided as temporary total ventilation air volume setting part 13. However, a temporary total ventilation air volume setting part 13 is not limited to such a switch, and it is sufficient that temporary total ventilation air volume setting part 13 is formed of a switch which can set a set value by switching.

Figure 5:
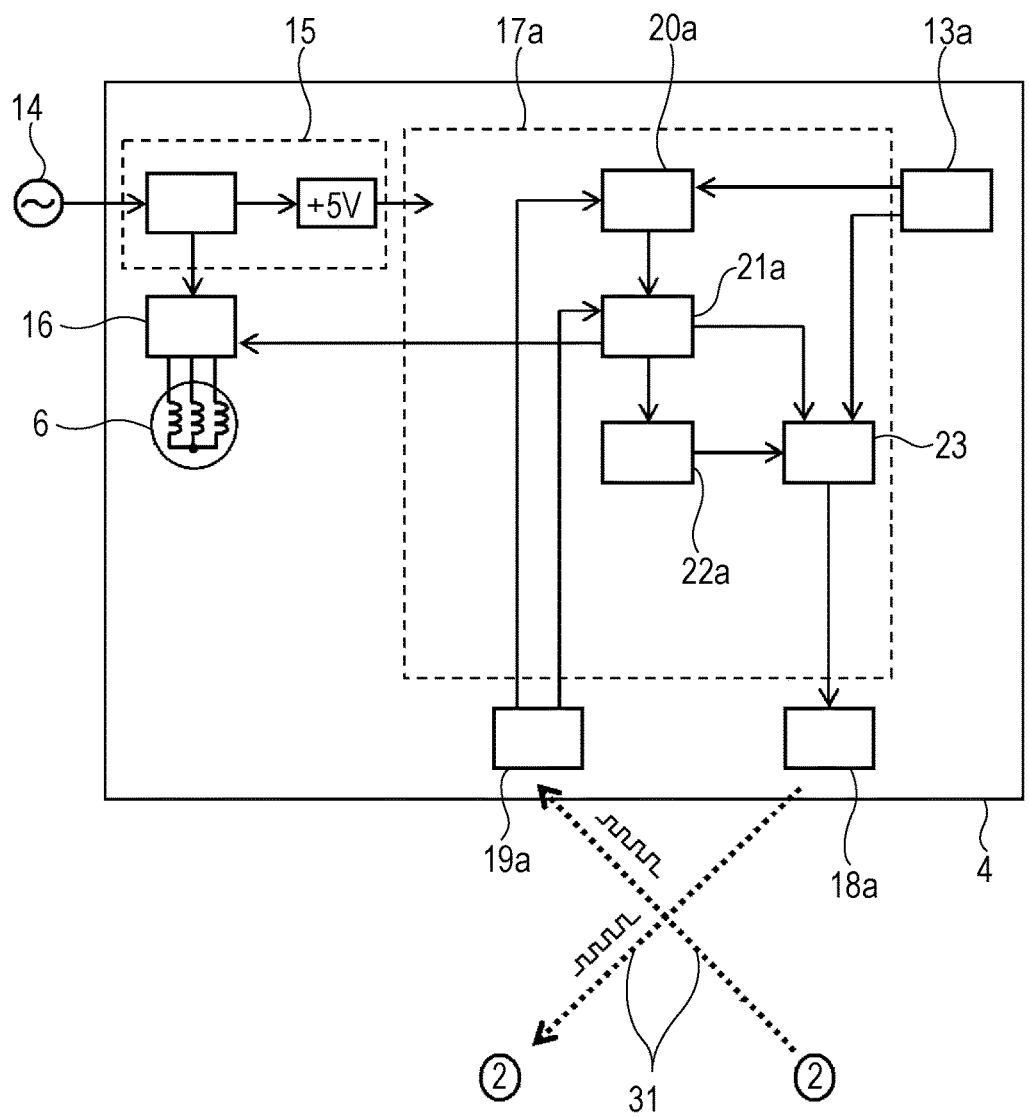
FIG. 5 is a control block diagram of the ventilation apparatus.

Next, a block diagram of a control circuit which controls a ventilation air volume of first ventilation apparatus 1 shown in FIG. 2 is described with reference to FIG. 5. FIG. 5 is a control block diagram of the ventilation apparatus of the first exemplary embodiment of the present invention. As shown in the block diagram, the control circuit includes: power source circuit 15 connected to commercial power source 14; blower 6 which uses a DC motor; and first control part 17a which adjusts a rotational speed of blower 6. In this exemplary embodiment, the DC motor includes stator windings of three phases (U phase, V phase, W phase) which are connected to power source circuit 15 configured to generate an output voltage, through drive IC (Integrated Circuit) 16 which is an assembly of switching elements such as FETs (Field Effect Transistors) and the like.

As shown in the block diagram, the control circuit includes: first temporary total ventilation air volume setting part 13a; first information transmission part 18a which transmits information to second ventilation apparatus 2; and first information reception part 19a which acquires information from second ventilation apparatus 2. In this manner, first ventilation apparatus 1 shown in FIG. 2 includes: first control part 17a which decides the operation of first ventilation apparatus 1; first information transmission part 18a; and first information reception part 19a.

As shown in FIG. 5, power source circuit 15, drive IC 16, first temporary total ventilation air volume setting part 13a, first information transmission part 18a and first information reception part 19a are connected to first control part 17a.

First control part 17a is driven with DC5V or DC3V which is an output voltage of power source circuit 15. First control part 17a is constituted of a CPU (Central Processing Unit). First control part 17a is operated in accordance with a program where a counter, a RAM (Random Access Memory) and a ROM (Read Only Memory) in first control part 17a are operated in a cooperative manner.

First control part 17a is constituted of: first total ventilation air volume determination part 20a; first-ventilation-apparatus first air volume decision part 21a; first air volume detection part 22a; and calculation buffer 23. In this exemplary embodiment, first total ventilation air volume determination part 20a determines total ventilation air volume Q necessary for house 30 shown in FIG. 1. First-ventilation-apparatus first air volume decision part 21a decides a first-ventilation-apparatus target air volume of first ventilation apparatus 1 necessary for maintaining total ventilation air volume Q based on information on second ventilation apparatus 2 received by first information reception part 19a. First air volume detection part 22a detects an air volume which blower 6 actually outputs. That is, first air volume detection part 22a detects the first-ventilation-apparatus output air volume which first ventilation apparatus 1 actually outputs, and when the first-ventilation-apparatus output air volume and the first-ventilation-apparatus target air volume differ from each other, first air volume detection part 22a informs second ventilation apparatus 2 of the first-ventilation-apparatus output air volume as a preferential air volume through first information transmission part 18a. Calculation buffer 23 stores information on first ventilation apparatus 1 for the purpose of calculation.

First information transmission part 18a and first information reception part 19a shown in FIG. 5 transmit and receive communication ID which allows a communication counterpart to identify a transmission source and information relating to an air volume of a ventilation apparatus between the ventilation apparatuses. The connection between information transmission parts 18 and information reception parts 19 of the respective ventilation apparatuses, that is, information transmission network 31 between the respective ventilation apparatuses may be a wired network or a wireless network, and various information transmission networks 31 are applicable. In this manner, in the ventilation system, the ventilation apparatuses are connected to each other through information transmission network 31 of one system. First information transmission part 18a transmits information to second ventilation apparatus 2 through information transmission network 31. First information reception part 19a receives information from second ventilation apparatus 2 through information transmission network 31.

First total ventilation air volume determination part 20a shown in FIG. 5 compares temporary total ventilation air volume Q(1) set by first temporary total ventilation air volume setting part 13a and temporary total ventilation air volume Q(2) of the second ventilation apparatus received by first information reception part 19a to each other, and first total ventilation air volume determination part 20a sets the largest temporary total ventilation air volume Q(n) as total ventilation air volume Q which house 30 is required to have. First total ventilation air volume determination part 20a is connected to first-ventilation-apparatus first air volume decision part 21a. Total ventilation air volume Q is the largest temporary total ventilation air volume Q(n) among temporary total ventilation air volumes Q(n). It is sufficient that temporary total ventilation air volume Q(n) be set in any one ventilation apparatus among the plurality of ventilation apparatuses.

First-ventilation-apparatus first air volume decision part 21a decides first-ventilation-apparatus target air volume q(1) based on total ventilation air volume Q decided by first total ventilation air volume determination part 20a and information on second ventilation apparatus 2, and adjusts an air volume of blower 6 through drive IC 16.

First air volume detection part 22a shown in FIG. 5 may detect an air volume by using a sensor (not shown) which is disposed inside duct 8 shown in FIG. 3 and configured to detect an air volume. Alternatively, first air volume detection part 22a may detect a first-ventilation-apparatus output air volume which blower 6 actually outputs (output air volume $q_R(1)$) by a method where the air volume is detected based on information on an electric current supplied to blower 6 or a rotational speed of blower 6. First air volume detection part 22a compares first-ventilation-apparatus output air volume $q_R(1)$ and first-ventilation-apparatus target air volume q(1) set in blower 6 to each other. When first-ventilation-apparatus output air volume $q_R(1)$ and first-ventilation-apparatus target air volume q(1) differ from each other as a result of comparison, first air volume detection part 22a informs second ventilation apparatus 2 of the fact that blower 6 is operated with a preferential air volume having priority over first-ventilation-apparatus target air volume q(1) set in blower 6. Accordingly, first air volume detection part 22a sets first-ventilation-apparatus output air volume $q_R(1)$ which blower 6 actually outputs as preferential air volume P(1) of first ventilation apparatus 1.

On the other hand, when first-ventilation-apparatus output air volume $q_R(1)$ and first-ventilation-apparatus target air volume q(1) are equal to each other, first air volume detection part 22a sets preferential air volume P(1) to 0 (P(1)=0). The description "when first-ventilation-apparatus output air volume $q_R(1)$ and first-ventilation-apparatus target air volume q(1) are equal to each other" also includes a case where first-ventilation-apparatus output air volume $q_R(1)$ and first-ventilation-apparatus target air volume q(1) substantially agree with each other within a certain range. When first-ventilation-apparatus output air volume $q_R(1)$ falls within a range of ±5% with respect to first-ventilation-apparatus target air volume q(1), for example, it is determined that first-ventilation-apparatus output air volume $q_R(1)$ and first-ventilation-apparatus target air volume q(1) are equal to each other. In other words, a case where "first-ventilation-apparatus output air volume $q_R(1)$ and first-ventilation-apparatus target air volume q(1) differ from each other" means that first-ventilation-apparatus output air volume $q_R(1)$ falls outside the range of ±5% with respect to first-ventilation-apparatus target air volume q(1).

First air volume detection part 22a is connected to calculation buffer 23, and preferential air volume P(1) is stored in calculation buffer 23.

Calculation buffer 23 stores information on temporary total ventilation air volume Q(1) set by first temporary total ventilation air volume setting part 13a and information on preferential air volume P(1) for the purpose of calculation, and calculation buffer 23 is connected to first information transmission part 18a. In this exemplary embodiment, information on preferential air volume P(1) is an air volume to be set in first ventilation apparatus 1 in preference over first-ventilation-apparatus target air volume q(1) decided by first-ventilation-apparatus first air volume decision part 21a. In calculation buffer 23, information on communication ID by which a communication counterpart can be identified at the time of transmitting and receiving information to and from second ventilation apparatus 2 is stored in advance.

Figure 6:
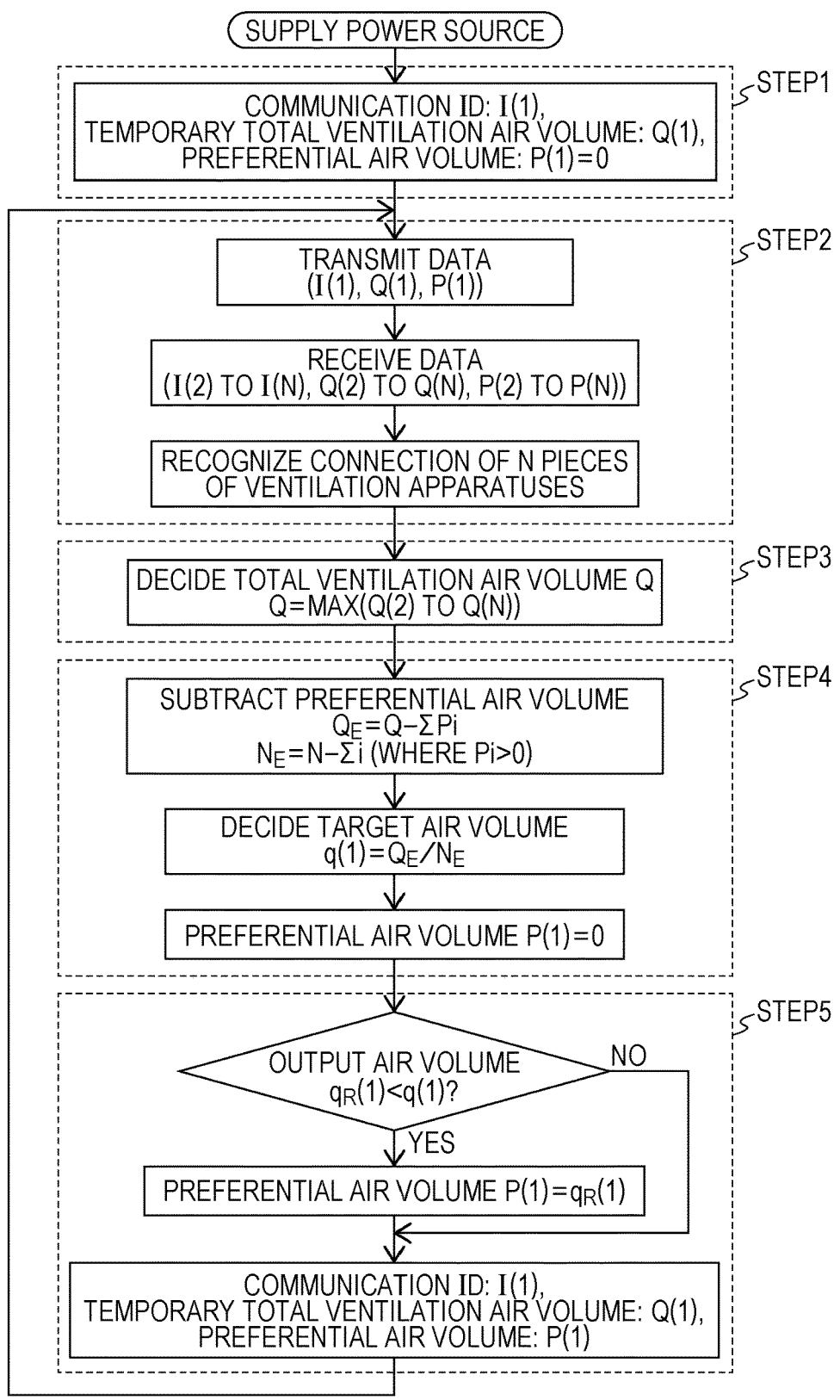
FIG. 6 is a control flowchart of the ventilation apparatus.

With respect to the above-mentioned configuration, the operation of controlling an air volume of the ventilation apparatus is described with reference to a flowchart shown in FIG. 6. FIG. 6 is a control flowchart of the ventilation apparatus of the first exemplary embodiment of the present invention. The flow of the operation of controlling an air volume of first ventilation apparatus 1 shown in FIG. 2 can be described in accordance with the following five steps as shown in FIG. 6.

That is, the flow of the operation of controlling an air volume of first ventilation apparatus 1 includes: the flow (STEP 1) of storing information on temporary total ventilation air volume Q(1) set by first ventilation apparatus 1 and information on initial preferential air volume P(1) (P(1)=0 [m³/h]) in calculation buffer 23 shown in FIG. 5; the flow (STEP 2) of transmitting information stored in calculation buffer 23 to second ventilation apparatus 2 through first information transmission part 18a shown in FIG. 5 and receiving information from second ventilation apparatus 2 through first information reception part 19a; the flow (STEP 3) showing operations performed by first total ventilation air volume determination part 20a shown in FIG. 5; the flow (STEP 4) showing operations performed by first-ventilation-apparatus first air volume decision part 21a shown in FIG. 5; and the flow (STEP 5) showing operations performed by first air volume detection part 22a shown in FIG. 5.

Hereinafter, the flow of the operation of controlling an air volume of first ventilation apparatus 1 is described in detail.

In STEP 1 shown in FIG. 6, when a power source is supplied to first ventilation apparatus 1 and second ventilation apparatus 2, in first ventilation apparatus 1, temporary total ventilation air volume Q(1) set by first temporary total ventilation air volume setting part 13a is stored in calculation buffer 23. Further, information on initial preferential air volume P(1) (P(1)=0 [m³/h]) is stored in calculation buffer 23.

In the first exemplary embodiment, temporary total ventilation air volume Q(n) is directly set by first temporary total ventilation air volume setting part 13a as shown in FIG. 4A. For example, assume that temporary total ventilation air volume Q(1) of 150 [m³/h] (Q(1)=150 [m³/h]) is set by first temporary total ventilation air volume setting part 13a, and temporary total ventilation air volume Q(2) of 170 [m³/h] (Q(2)=170 [m³/h]) is set by second temporary total ventilation air volume setting part 13b. Such information is stored in calculation buffer 23.

Communication ID of first ventilation apparatus 1 is 101 (I(1)=101), and communication ID of second ventilation apparatus 2 is 102 (I(2)=102). Communication ID of first ventilation apparatus 1 and communication ID of second ventilation apparatus 2 are stored in calculation buffer 23 of first ventilation apparatus 1 and calculation buffer 23 of second ventilation apparatus 2 respectively.

As described above, 0 [m³/h] is stored in calculation buffer 23 as initial preferential air volume P(1) of first ventilation apparatus 1 (P(1)=0 [m³/h]), and 0 [m³/h] is stored in calculation buffer 23 as initial preferential air volume P(2) of second ventilation apparatus 2 (P(2)=0 [m³/h]).

Next, in STEP 2 shown in FIG. 6, first information transmission part 18a transmits information on temporary total ventilation air volume Q(n), information on preferential air volume P(n) and information on communication ID which are stored in calculation buffer 23 to second ventilation apparatus 2. That is, first information transmission part 18a of first ventilation apparatus 1 transmits temporary total ventilation air volume Q(1), preferential air volume P(1) and information I(1) on communication ID which are set in first ventilation apparatus 1 to second ventilation apparatus 2.

In the same manner, second information transmission part 18b of second ventilation apparatus 2 transmits temporary total ventilation air volume Q(2), preferential air volume P(2) and information I(2) on communication ID which are set in second ventilation apparatus 2 to first ventilation apparatus 1. As a result, bidirectional communication between first ventilation apparatus 1 and second ventilation apparatus 2 is completed so that respective information on two ventilation apparatuses and the state where two ventilation apparatuses are connected in house 30 are recognized.

Next, in STEP 3 in FIG. 6, first total ventilation air volume determination part 20a shown in FIG. 5 compares information on temporary total ventilation air volume Q(1) set by first ventilation apparatus 1 and information on temporary total ventilation air volume Q(2) set by second ventilation apparatus 2 with each other, and first total ventilation air volume determination part 20a recognizes the largest value as total ventilation air volume Q which house 30 is required to have. That is, assume that Q=Q(2)=170 [m³/11].

Next, first-ventilation-apparatus first air volume decision part 21a shown in FIG. 5 decides target air volume q(n) per one ventilation apparatus based on information recognized in STEP 2 that two ventilation apparatuses are connected in house 30, information that total ventilation air volume Q necessary for house 30 is 170 [m³/h] (Q=170 [m³/h]), and information on preferential air volume P(2) of second ventilation apparatus 2 received by first information reception part 19a.

In the first exemplary embodiment, both a prescribed air volume of first ventilation apparatus 1 and a prescribed air volume of second ventilation apparatus 2 are 150 [m³/h] respectively. Accordingly, when two ventilation apparatuses 1, 2 are simultaneously operated with prescribed capacities, a prescribed air volume becomes 300 [m³/h] (prescribed air volume=150×2=300 [m³/h]) so that the ventilation system is brought into an air volume excess state with respect to required total ventilation air volume Q(Q=170 [m³/h]) by 130 [m³/11].

In view of the above, air volumes of the respective ventilation apparatuses are obtained simply by equally dividing required total ventilation air volume Q by the number N of installed ventilation apparatuses. That is, target air volume q(1) of first ventilation apparatus 1 and target air volume q(2) of second ventilation apparatus 2 are set as follows.

$$q(1)=q(2)=Q/N=170/2=85[m^3/h]$$

Next, in STEP 4 shown in FIG. 6, preferential air volume P(n) is confirmed. First-ventilation-apparatus first air volume decision part 21a decides a new air volume in such a manner that a remaining air volume obtained by subtracting set preferential air volume P(n) from total ventilation air volume Q is equally allocated to ventilation apparatuses in which preferential air volume P(n) is not set.

In this case, both preferential air volume P(n) of first ventilation apparatus 1 and preferential air volume P(n) of second ventilation apparatus 2 are 0 [m³/h] so that no ventilation apparatus is operated with preferential air volume P(n). Accordingly, remaining air volume $Q_E$ obtained by subtracting an air volume of the ventilation apparatus in which preferential air volume P(n) is set from total ventilation air volume Q is 170 [m³/h] ($Q_E$=Q=170 [m³/h]). The number $N_E$ of ventilation apparatuses in which preferential air volume P(n) is not set is 2 [pieces] ($N_E$=N=2 [pieces]). Target air volumes q(n) of the respective ventilation apparatuses are obtained by equally dividing remaining air volume $Q_E$ [m³/h] by the number $N_E$ of ventilation apparatuses. Accordingly, first-ventilation-apparatus target air volume q(1) of first ventilation apparatus 1 is 85 [m³/h] (q(1)=$Q_E/N_E$=170/2=85 [m³/h]). Second-ventilation-apparatus target air volume q(2) of second ventilation apparatus 2 is 85 [m³/h] (q(2)=$Q_E/N_E$=170/2=85 [m³/h]).

That is, when the first ventilation apparatus and the second ventilation apparatus are operated with first-ventilation-apparatus target air volume q(1) and second-ventilation-apparatus target air volume q(2), both actual first-ventilation-apparatus output air volume $q_R(1)$ and actual second-ventilation-apparatus output air volume $q_R(2)$ are approximately 85 [m³/h]. Accordingly, total ventilation air volume to be output is 170 [m³/h] ($q_R(1)+q_R(2)$=85+85=170 [m³/h]) and hence, total ventilation air volume Q of 170 [m³/h] (Q=170 [m³/h]) is satisfied.

Next, a case where actual output air volume $q_R(n)$ differs from target air volume q(n) is described. As shown in FIG. 3, one end of duct 8 is connected to indoor air discharge opening portion 5. Further, in a general installation state, the other end of duct 8 extends to the outside of the house. Accordingly, a pressure loss is increased or decreased depending on a length of duct 8 so that there may be a case where a predetermined air volume (target air volume q(n)) which is initially set cannot be ensured.

There arises no problem when duct 8 of first ventilation apparatus 1 and duct 8 of second ventilation apparatus 2 are installed with lengths which fall within allowable values in terms of design so that first ventilation apparatus 1 and second ventilation apparatus 2 respectively exhibit a capacity substantially equal to first-ventilation-apparatus target air volume q(1) and a capacity substantially equal to second-ventilation-apparatus target air volume q(2), However, for example, there may be a case where duct 8 of second ventilation apparatus 2 is installed with a length larger than the allowable value in terms of design so that second ventilation apparatus 2 can exhibit only a capacity q(2) of 50 [m³/h] (q(2)=50 [m³/h]).

In STEP 5 shown in FIG. 6, first air volume detection part 22a shown in FIG. 5 detects first-ventilation-apparatus output air volume $q_R(1)$ which blower 6 actually outputs. When actual first-ventilation-apparatus output air volume $q_R(1)$ differs from first-ventilation-apparatus target air volume q(1) as a result of comparison, to inform second ventilation apparatus 2 of this result, first air volume detection part 22a sets the actually output first-ventilation-apparatus output air volume $q_R(1)$ as a result of not realizing first-ventilation-apparatus target air volume q(1) as preferential air volume P(1) of the first ventilation apparatus.

In the above-mentioned case, that is, when second ventilation apparatus 2 exhibits only a capacity of 50 [m³/h] ($q_R(2)$=50 [m³/h]), first air volume detection part 22a detects actual first-ventilation-apparatus output air volume $q_R(1)$ of first ventilation apparatus 1 ($q_R(1)$=85 [m³/h]), sets 0 [m³/h] as a preferential air volume P(1) (P(1)=0 [m³/h]), and stores this information in calculation buffer 23. On the other hand, second air volume detection part 22b detects actual second-ventilation-apparatus output air volume $q_R(2)$ of second ventilation apparatus 2 ($q_R(2)$=50 [m³/h]), sets 50 [m³/h] as preferential air volume P(2) (P(2)=$q_R(2)$=50 [m³/h]), and stores this information in calculation buffer 23. However, if no adjustment is made, total ventilation air volume to be output becomes 135 [m³/h] ($q_R(1)+q_R(2)$=85+50=135 [m³/h]) so that total ventilation air volume Q=170 [m³/h] is not satisfied.

In such a state, processing returns to STEP 2 again where first information transmission part 18a of first ventilation apparatus 1 transmits communication ID, preferential air volume P(1) (P(1)=0) and temporary total ventilation air volume Q(1) (Q(1)=150) of first ventilation apparatus 1.

Second information transmission part 18b of second ventilation apparatus 2 transmits communication ID, preferential air volume P(2) (P(2)=50) and temporary total ventilation air volume Q(2) (Q(2)=170) of second ventilation apparatus 2. First information reception part 19a and second information reception part 19b receive such information.

Next, in STEP 3 shown in FIG. 6, total ventilation air volume Q is decided by first total ventilation air volume determination part 20a. Information on temporary total ventilation air volume Q(1) and information on temporary total ventilation air volume Q(2) are not changed so that total ventilation air volume Q remains at 170 [m³/h] (Q=170 [m³/h]).

Next, in STEP 4 in FIG. 6, an air volume per one ventilation apparatus is decided by first-ventilation-apparatus first air volume decision part 21a. Here, 50 [m³/h] is set as preferential air volume P(2) (P(2)=50 [m³/h]) in second ventilation apparatus 2. When preferential air volume P(1) of first ventilation apparatus 1 is not set, first-ventilation-apparatus first air volume decision part 21a calculates target air volume q(n) based on a value obtained by subtracting preferential air volume P(2) of second ventilation apparatus 2 from total ventilation air volume Q and the number of ventilation apparatuses in which a preferential air volume is not set (P(n)=0).

That is, first-ventilation-apparatus first air volume decision part 21a acquires air volume $Q_E$ ($Q_E$=170−50=120 [m³/h]) which a ventilation apparatus in which preferential air volume P(n) is not set is required to ventilate by subtracting preferential air volume P(2) of second ventilation apparatus 2 from total ventilation air volume Q.

First-ventilation-apparatus first air volume decision part 21a also acquires the number $N_E$ of ventilation apparatuses in which a preferential air volume is not set ($N_E$=2−1=1 [piece]). Accordingly, first-ventilation-apparatus target air volume q1 is decided as follows.

$$q(1)=Q_E/N_E=120/1=120[m^3/h]$$

Preferential air volume P(2) of second ventilation apparatus 2 is set in second-ventilation-apparatus first air volume decision part 21b and hence, second ventilation apparatus 2 is operated using second-ventilation-apparatus target air volume q(2) as preferential air volume P(2).

That is, when preferential air volume P(n) is not set (P(n)=0), the ventilation apparatus is operated with target air volume q(n) (q(n)=Q/N) obtained from the number N of ventilation apparatuses and total ventilation air volume Q. On the other hand, when preferential air volume P(n) is set (P(n)≠0), the ventilation apparatus is operated with target air volume q(n) obtained initially. (In this case, although second ventilation apparatus 2 is operated with second-ventilation-apparatus target air volume q(2) (q(2)=85 [m³/h]), only 50 [m³/h] is output actually ($q_R$(2)=50 [m³/h]).)

Next, blowers 6 are driven with new first-ventilation-apparatus target air volume q(1) and new second-ventilation-apparatus target air volume q(2) and, in STEP 5 in FIG. 6, first air volume detection part 22a detects an actual air volume. Assuming that first ventilation apparatus 1 exhibits its capacity, first air volume detection part 22a detects actual first-ventilation-apparatus output air volume $q_R$(1) of first ventilation apparatus 1 ($q_R$(1)=120 [m³/h]), 0 [m³/h] is set as preferential air volume P(1) (P(1)=0 [m³/h]), and actual first-ventilation-apparatus output air volume $q_R$(1) and preferential air volume P(1) are stored in calculation buffer 23. On the other hand, second air volume detection part 22b detects actual second-ventilation-apparatus output air volume $q_R$(2) of second ventilation apparatus 2 ($q_R$(2)=50 [m³/h]), 50 [m³/h] is set as preferential air volume P(2) (P(2)=$q_R$(2)=50 [m³/h]), and actual second-ventilation-apparatus output air volume $q_R$(2) and preferential air volume P(2) are stored in calculation buffer 23.

Accordingly, a total ventilation air volume Q becomes 170 [m³/h] ($q_R$(1)+$q_R$(2)=120+50=170 [m³/h]), and total ventilation air volume Q=170 [m³/h] is maintained.

In the first exemplary embodiment, the case where two ventilation apparatuses are used is described. However, even in cases where the number of ventilation apparatuses is increased, the first exemplary embodiment is applicable to such cases, and substantially the same advantageous effects can be acquired also in such cases. That is, the ventilation system is formed of n (n being an integer of 2 or more) pieces of ventilation apparatuses including first ventilation apparatus 1 to nth ventilation apparatus N installed inside house 30.

First ventilation apparatus 1 includes: first information transmission part 18a; first information reception part 19a; and first control part 17a. First information transmission part 18a transmits information to the ventilation apparatuses ranging from second ventilation apparatus 2 to nth ventilation apparatus N through information transmission network 31. First information reception part 19a receives information on the ventilation apparatuses ranging from second ventilation apparatus 2 to nth ventilation apparatus N through information transmission network 31.

First control part 17a includes: first total ventilation air volume determination part 20a; first-ventilation-apparatus first air volume decision part 21a; and first air volume detection part 22a. First total ventilation air volume determination part 20a determines total ventilation air volume necessary for house 30. First-ventilation-apparatus first air volume decision part 21a decides first-ventilation-apparatus target air volume necessary for maintaining a total ventilation air volume based on information on the ventilation apparatuses ranging from second ventilation apparatus 2 to nth ventilation apparatus N received by first information reception part 19a. First air volume detection part 22a detects the first-ventilation-apparatus output air volume which first ventilation apparatus 1 actually outputs, and when the first-ventilation-apparatus output air volume and the first-ventilation-apparatus target air volume differ from each other, first air volume detection part 22a informs ventilation apparatuses ranging from second ventilation apparatus 2 to nth ventilation apparatus N of the first-ventilation-apparatus output air volume as a preferential air volume through first information transmission part 18a. Further, mth ventilation apparatus M where m is an integer which satisfies 2≤m≤n includes: mth information transmission part 18m; mth information reception part 19m; and mth control part 17m. mth information transmission part 18m transmits information to the ventilation apparatuses ranging from first ventilation apparatus 1 to (m−1)th ventilation apparatus (M−1) and the ventilation apparatuses ranging from (m+1)th ventilation apparatus (M+1) to nth ventilation apparatus N through information transmission network 31. mth information reception part 19m receives information on the ventilation apparatuses ranging from first ventilation apparatus 1 to (m−1)th ventilation apparatus (M−1) and the ventilation apparatuses ranging from (m+1)th ventilation apparatus (M+1) to nth ventilation apparatus N through information transmission network 31. mth control part 17m decides the operation of mth ventilation apparatus M.

mth control part 17m includes: mth total ventilation air volume determination part 20m; mth-ventilation-apparatus first air volume decision part 21m; and mth air volume detection part 22m. In this exemplary embodiment, mth total ventilation air volume determination part 20m determines a total ventilation air volume. mth-ventilation-apparatus first air volume decision part 21m decides mth-ventilation-apparatus target air volume necessary for maintaining the total ventilation air volume based on information on the ventilation apparatuses ranging from first ventilation apparatus 1 to (m−1)th ventilation apparatus (M−1) and the ventilation apparatuses ranging from (m+1)th ventilation apparatus (M+1) to nth ventilation apparatus N received by mth information reception part 19m. mth air volume detection part 22m detects an mth-ventilation-apparatus output air volume which mth ventilation apparatus M actually outputs, and when the mth-ventilation-apparatus output air volume and the mth-ventilation-apparatus target air volume differ from each other, mth air volume detection part 22m informs the ventilation apparatuses ranging from first ventilation apparatus 1 to (m−1)th ventilation apparatus (M−1) and the ventilation apparatuses ranging from (m+1)th ventilation apparatus (M+1) to nth ventilation apparatus N of the mth-ventilation-apparatus output air volume as a preferential air volume through mth information transmission part 18m.

Further, first ventilation apparatus 1 and mth ventilation apparatus M respectively include temporary total ventilation air volume setting part 13 for setting a temporary total ventilation air volume of house 30. First information transmission part 18a transmits the temporary total ventilation air volume to mth ventilation apparatus M as transmission information. mth information transmission part 18m transmits the temporary total ventilation air volume to the ventilation apparatuses ranging from first ventilation apparatus 1 to (m−1)th ventilation apparatus (M−1) and the ventilation apparatuses ranging from (m+1)th ventilation apparatus (M+1) to nth ventilation apparatus N as transmission information.

First total ventilation air volume determination part 20a determines the largest temporary total ventilation air volume among the temporary total ventilation air volumes acquired through first information reception part 19a as total ventilation air volume necessary for house 30. mth total ventilation air volume determination part 20m determines the largest temporary total ventilation air volume among the temporary total ventilation air volumes acquired through mth information reception part 19m as a total ventilation air volume necessary for house 30.

As described above, in the ventilation system of the first exemplary embodiment of the present invention, the respective ventilation apparatuses mutually acquire information from each other. The ventilation apparatus determines its own ventilation air volume based on information on a total ventilation air volume decided by total ventilation air volume determination part 20 and information on a preferential air volume having priority over a set air volume of the installed ventilation apparatus, and the ventilation apparatus is operated with its own determined ventilation air volume. Accordingly, even in a situation where a ventilation capacity of each ventilation apparatus is larger or smaller than total ventilation air volume Q necessary for whole house 30, ventilation apparatuses increase or decrease their own air volumes so that an air volume of whole house 30 is maintained at an optimum value.

In the ventilation system of the first exemplary embodiment, first ventilation apparatus 1 and second ventilation apparatus 2 respectively include first temporary total ventilation air volume setting part 13a and second temporary total ventilation air volume setting part 13b. However, the ventilation system may include a total ventilation air volume setting device which sets total ventilation air volume Q in the same information transmission network 31.

Second Exemplary Embodiment

In a second exemplary embodiment of the present invention, constitutional elements substantially equal to the constitutional elements of the first exemplary embodiment are given the same symbols, and the detailed description of such constitutional elements is omitted, and only different elements are described. Also in the second exemplary embodiment of the present invention, the description is made by taking first ventilation apparatus 1 as an example with reference to FIG. 7 to FIG. 11.

Figure 7:
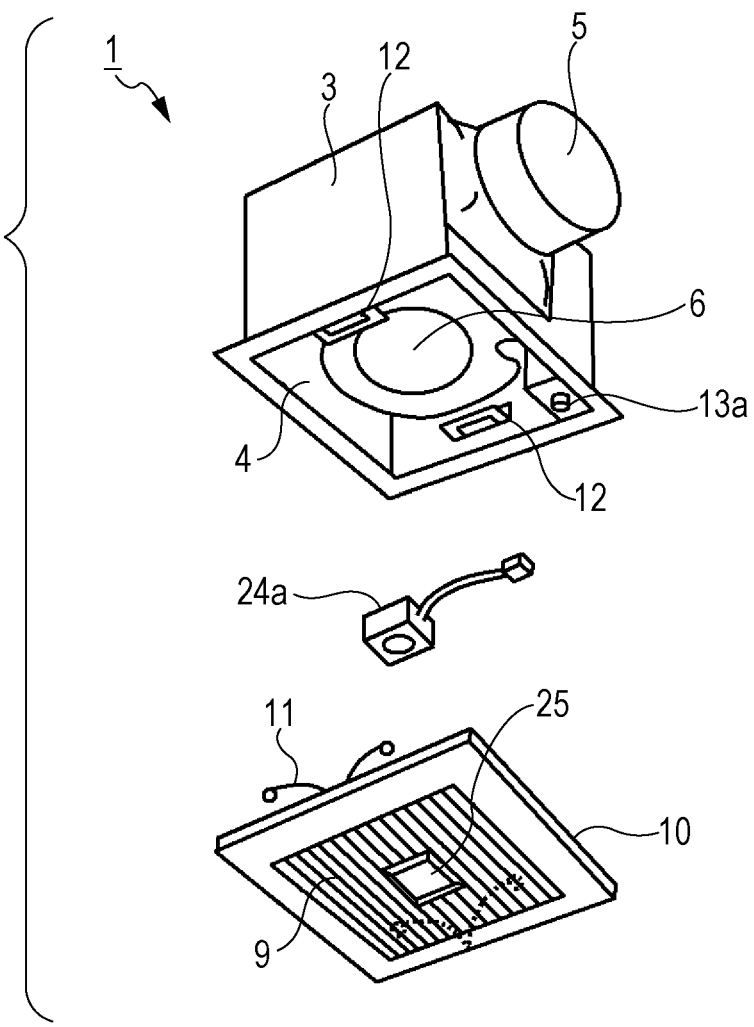
FIG. 7 is an exploded perspective view of a ventilation apparatus of a second exemplary embodiment of the present invention.

FIG. 7 is an exploded perspective view of a ventilation apparatus of the second exemplary embodiment of the present invention. As shown in FIG. 7, first ventilation apparatus 1 includes, in addition to the configuration of first ventilation apparatus 1 of the first exemplary embodiment, first outside air volume setting part 24a which can set an air volume having priority over an air volume decided by first-ventilation-apparatus first air volume decision part 21a shown in FIG. 5 (hereinafter referred to as outside set air volume E(n)).

It is sufficient that first outside air volume setting part 24a can uniquely decide outside set air volume E(n) with respect to an input value. For example, as shown in FIG. 7, first outside air volume setting part 24a is mounted in outside air volume setting part mounting hole 25 formed in ventilation hole 9 of decorative plate 10. Among a human sensor, a temperature sensor, a humidity sensor, a carbon monoxide sensor, a carbon dioxide sensor and an illuminance sensor, at least one is mounted on first outside air volume setting part 24a, and outside set air volume E(n) may be decided corresponding to a detection state detected by the sensor.

Figure 8:
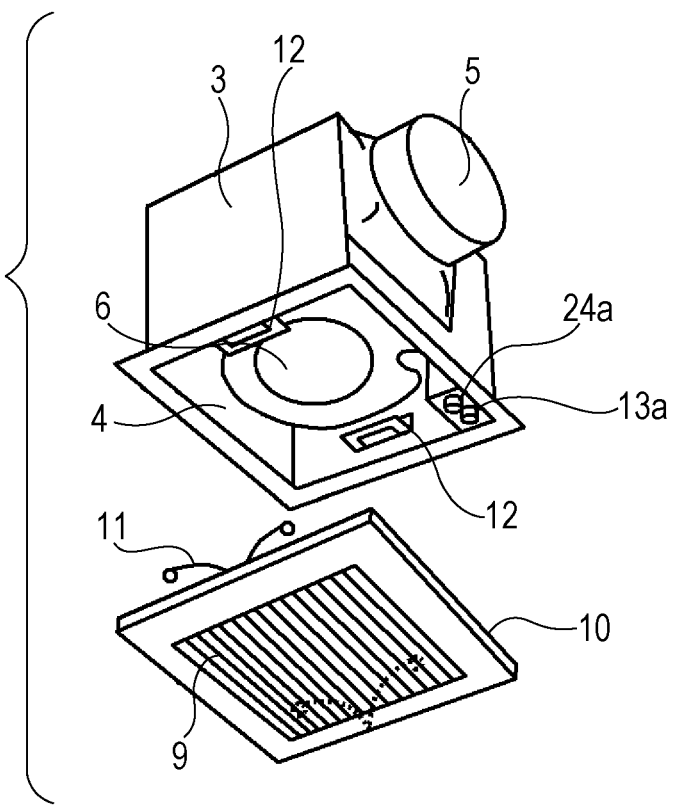
FIG. 8 is an exploded perspective view of a different example of the ventilation apparatus.

FIG. 8 is an exploded perspective view of a different example of the ventilation apparatus of the second exemplary embodiment of the present invention. As shown in FIG. 8, first outside air volume setting part 24a is mounted at a position where decorative plate 10 can be detachably mounted and a user can easily observe and operate first outside air volume setting part 24a.

Figures 9A, 9B:
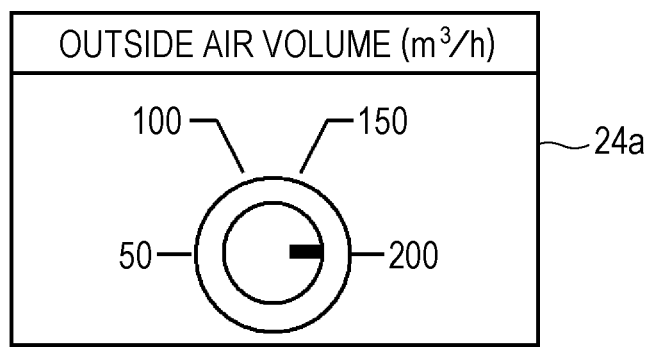
FIG. 9A is an external appearance view showing an outside air volume setting part of the ventilation apparatus.
FIG. 9B is a table showing the correlation between air volume setting and an air volume acquired by the outside air volume setting part of the ventilation apparatus.

FIG. 9A is an external appearance view showing an outside air volume setting part of the ventilation apparatus of the second exemplary embodiment of the present invention, and FIG. 9B is a table showing the correlation between air volume setting and an air volume acquired by the outside air volume setting part of the ventilation apparatus. As shown in FIG. 9A, outside set air volume E(n) may be set at multiple stages. As shown in FIG. 9B, outside set air volume E(n) may be set such that a set value which is decided uniquely is set at multiple stages.

In the description made hereinafter, first outside air volume setting part 24a has the configuration shown in FIG. 7, and includes a human sensor (not shown) which detects the presence or non-presence of a human. When the human sensor detects a human, a first prescribed air volume of first ventilation apparatus 1 is set as outside set air volume E(n).

Figure 10:
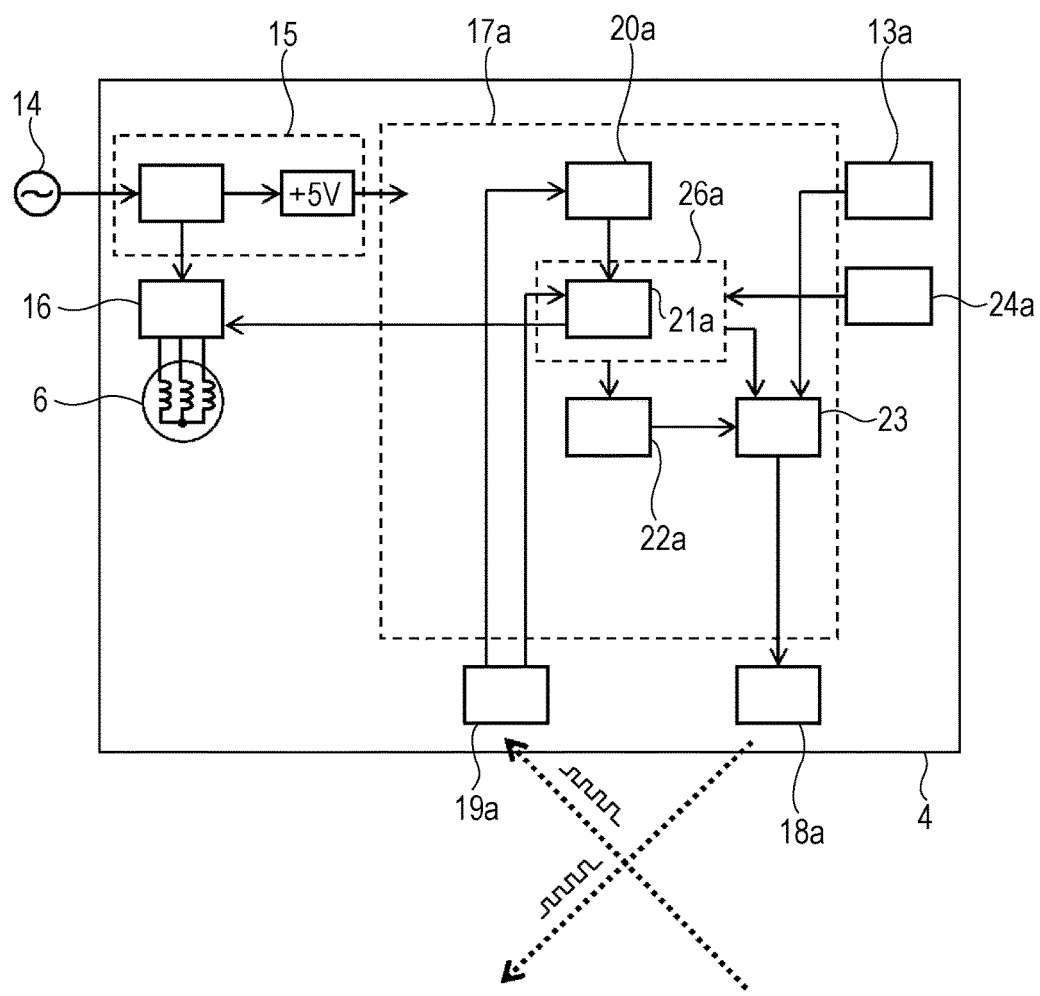
FIG. 10 is a control block diagram of the ventilation apparatus.

FIG. 10 is a control block diagram of the ventilation apparatus of the second exemplary embodiment of the present invention. As shown in FIG. 10, first outside air volume setting part 24a is connected to first control part 17a, and first control part 17a recognizes outside set air volume E(n) set by first outside air volume setting part 24a.

First control part 17a includes first-ventilation-apparatus second air volume decision part 26a. A program is executed in first-ventilation-apparatus second air volume decision part 26a, and first-ventilation-apparatus second air volume decision part 26a incorporates first-ventilation-apparatus first air volume decision part 21a therein. When an outside air volume is set by first outside air volume setting part 24a, first-ventilation-apparatus second air volume decision part 26a sets first-ventilation-apparatus target air volume q(1) of first ventilation apparatus 1 as outside set air volume E(1).

When outside set air volume E(1) is not set by first outside air volume setting part 24a, as has been described in the first exemplary embodiment, first-ventilation-apparatus first air volume decision part 21a decides first-ventilation-apparatus target air volume q(1) based on information on total ventilation air volume Q decided by first total ventilation air volume determination part 20a and preferential air volume P(2) of second ventilation apparatus 2 received by first information reception part 19a, and first-ventilation-apparatus first air volume decision part 21a adjusts an air volume of blower 6.

Hereinafter, assume a case where two ventilation apparatuses having the same specification including a prescribed air volume capacity of 150 [m$^3$/h] are installed in house 30 having a total floor area of 200 [m$^2$]. The description is made assuming that duct 8 of first ventilation apparatus 1 and duct 8 of second ventilation apparatus 2 are installed with lengths which fall within allowable values in terms of design so that first ventilation apparatus 1 and second ventilation apparatus 2 respectively exhibit a capacity substantially equal to total ventilation air volume Q.

Figure 11:
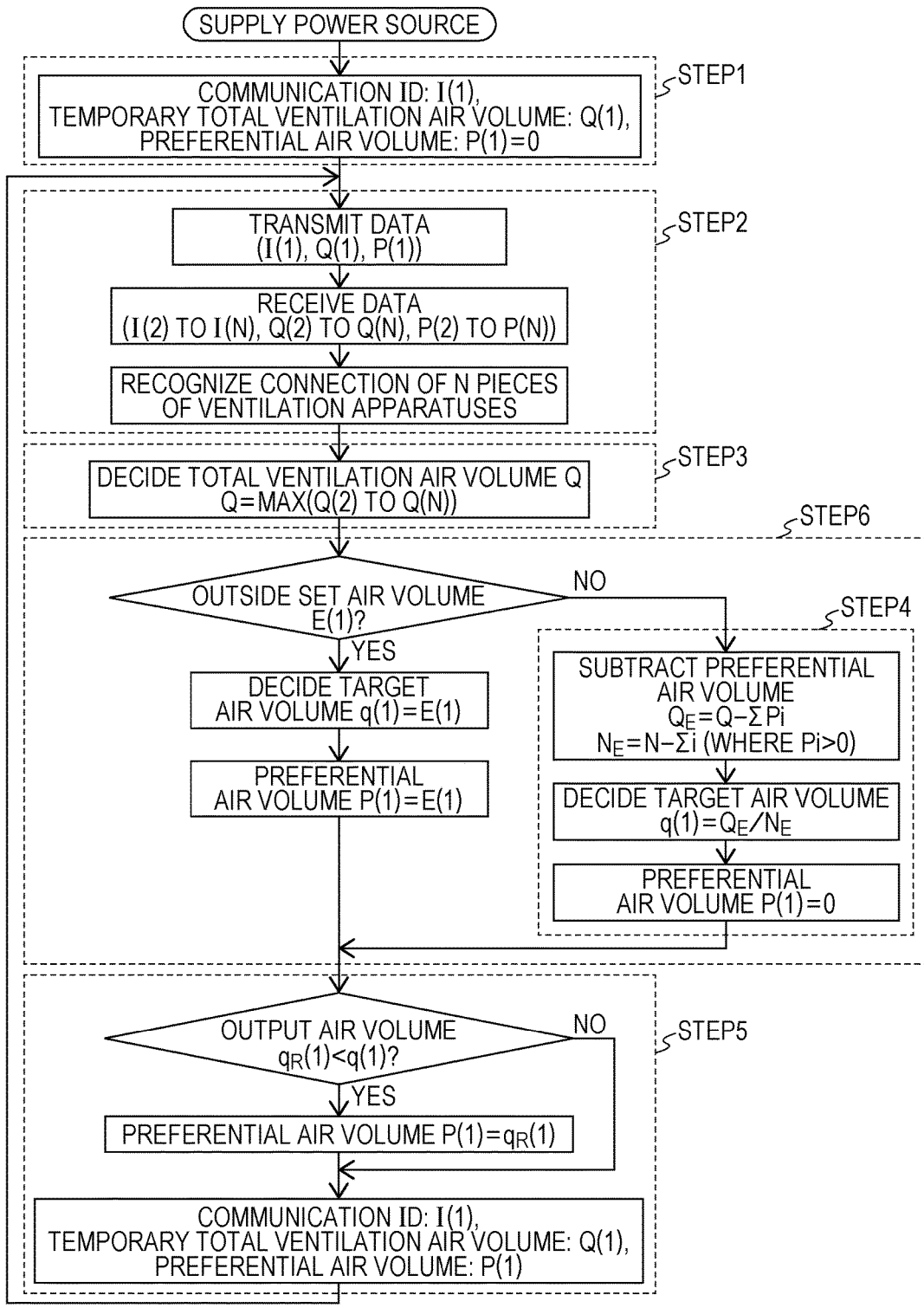
FIG. 11 is a control flowchart of the ventilation apparatus.

The operation of controlling air volumes of the ventilation apparatuses of the second exemplary embodiment having the above-mentioned configuration is described with reference to a flowchart shown in FIG. 11. FIG. 11 is a control flowchart of the ventilation apparatuses of the second exemplary embodiment of the present invention.

When outside set air volume E(n) is not set by first outside air volume setting part 24a, first-ventilation-apparatus second air volume decision part 26a shown in FIG. 10 performs the operation substantially equal to the operation performed by first-ventilation-apparatus first air volume decision part 21a. In this case, the flow of the operation in this exemplary embodiment is substantially equal to the flow of the operation including STEP 1 to STEP 5 in the first exemplary embodiment and hence, the description of the case where outside set air volume E(n) is not set by first outside air volume setting part 24a is omitted. The characteristic operation of first-ventilation-apparatus second air volume decision part 26a is described with respect to the case where the human sensor of first outside air volume setting part 24a of first ventilation apparatus 1 is in a detection state, and the human sensor of second outside air volume setting part 24b of second ventilation apparatus 2 is in a non-detection state.

In STEP 6 in FIG. 11, when the human sensor of first outside air volume setting part 24a shown in FIG. 10 is brought into a detection state, dirty air is forcibly discharged to the outside of the house and hence, a first prescribed air volume of first ventilation apparatus 1 is set as outside set air volume E(1). First-ventilation-apparatus second air volume decision part 26a shown in FIG. 10 receives outside set air volume E(1) from first outside air volume setting part 24a, sets a value of outside set air volume E(1) as first-ventilation-apparatus target air volume q(1) of first ventilation apparatus 1, and sets outside set air volume E(1) as preferential air volume P(1).

That is, first outside air volume setting part 24a shown in FIG. 10 sets 150 [m$^3$/h] which is the first prescribed air volume as outside set air volume E(1). Accordingly, first-ventilation-apparatus second air volume decision part 26a sets 150 [m$^3$/h] as first-ventilation-apparatus target air volume q(1) (q(1)=E(1)=150 [m$^3$/h]) so that 150 [m$^3$/h] is set as preferential air volume P(1) (P(1)=E(1)=150 [m$^3$/h]).

On the other hand, outside set air volume E(2) is not set by second outside air volume setting part 24b of second ventilation apparatus 2 (E(2)=0 [m$^3$/h]) and hence, second-ventilation-apparatus second air volume decision part 26b decides second-ventilation-apparatus target air volume q(2) of second ventilation apparatus 2 in STEP 4. That is, an air volume of second ventilation apparatus 2 remains at a value of 85 [m$^3$/h] (q(2)=85 [m$^3$/h]), and preferential air volume P(2) is 0 [m$^3$/h] (P(2)=0 [m$^3$/h]).

In STEP 5 in FIG. 11, first ventilation apparatus 1 is operated with a first prescribed air volume, and an actual air volume detected by first air volume detection part 22a shown in FIG. 10 is 150 [m$^3$/h] (q$_R$(1)=150 [m$^3$/h]), and an actual air volume detected by second air volume detection part 22b is 85 [m$^3$/h] (q$_R$(2)=85 [m$^3$/h]). If no adjustment is made, a total air volume of the air volume of first ventilation apparatus 1 and the air volume of second ventilation apparatus 2 is 235 [m$^3$/h] (q$_R$(1)+q$_R$(2)=150+85=235 [m$^3$/h]). Accordingly, the ventilation system is brought into an air volume excess state with respect to total ventilation air volume Q(Q=170 [m$^3$/h]) necessary for house 30 by 65[m$^3$/h].

However, as shown in STEP 4 in the first exemplary embodiment, preferential air volume P(1) (P(1)=150 [m$^3$/h]) of first ventilation apparatus 1 received by second information reception part 19b is set by second ventilation apparatus 2 and hence, second-ventilation-apparatus target air volume q(2) of second ventilation apparatus 2 is modified to 20 [m$^3$/h] (q(2)=Q$_E$/N$_E$=(170−150)/(2−1)=20/1=20 [m$^3$/h]).

Accordingly, the total air volume of first ventilation apparatus 1 and second ventilation apparatus 2 is 170 [m$^3$/h] (q$_R$(1)+q$_R$(2)=150+20=170 [m$^3$/h]) so that total ventilation air volume Q(Q=170 [m$^3$/h]) necessary for house 30 can be maintained.

Further, when a human leaves the house so that the human sensor of first outside air volume setting part 24a shown in FIG. 10 is brought into a non-detection state, outside set air volume E(1) of first ventilation apparatus 1 becomes 0 [m$^3$/h]. The number of ventilation apparatuses in which outside set air volume E(n) is set becomes 0 and hence, in STEP 4 in FIG. 11, the ventilation apparatuses are operated with ventilation-apparatus target air volumes of 85 [m$^3$/h] (q(1)=q(2)=85 [m$^3$/h]).

When both the human sensor in first ventilation apparatus 1 and the human sensor in second ventilation apparatus 2 are brought into a detection state and both outside set air volume E(n) of first ventilation apparatus 1 and outside set air volume E(n) of second ventilation apparatus 2 are set to prescribed ventilation air volumes of 150 [m$^3$/h] (E(1)=E(2)=150 [m$^3$/h]), dirty air in the respective spaces is forcibly discharged to the outside of the house. Accordingly, first ventilation apparatus 1 and second ventilation apparatus 2 are respectively operated with ventilation-apparatus target air volumes of 150 [m$^3$/h] (q(1)=q(2)=150 [m$^3$/h]) by giving priority to ensuring of ventilation air volumes. In this case, although the ventilation system is brought into a ventilation air volume excess state for a fixed time, human sensor 27 is brought into a non-detection state and, after dirty air is discharged, first ventilation apparatus 1 and second ventilation apparatus 2 are operated with the ventilation-apparatus target air volumes of 85 [m$^3$/h] (q(1)=q(2)=85 [m$^3$/h]) and hence, total ventilation air volume Q of 170 [m$^3$/h] (Q=170 [m$^3$/h]) is maintained.

In the second exemplary embodiment, the case where two ventilation apparatuses are used is described. However, even when the number of ventilation apparatuses is increased, substantially the same advantageous effect can be acquired. That is, first control part 17a includes first outside air volume setting part 24a which sets an air volume having priority over the first-ventilation-apparatus target air volume. mth control part 17m includes mth outside air volume setting part 24m which sets an air volume having priority over an mth-ventilation-apparatus target air volume.

The ventilation system includes first-ventilation-apparatus second air volume decision part 26a which informs mth ventilation apparatus M of an operation air volume set by first outside air volume setting part 24a as a preferential air volume through first information transmission part 18a. The ventilation system also includes mth-ventilation-apparatus second air volume decision part 26m which informs ventilation apparatuses ranging from first ventilation apparatus 1 to (m−1)th ventilation apparatus (M−1) and ventilation apparatuses ranging from (m+1)th ventilation apparatus (M+1) to nth ventilation apparatus N of an operation air volume set by mth outside air volume setting part 24m as a preferential air volume through mth information transmission part 18m.

In the second exemplary embodiment, the description is made with respect to the case where when the human sensor of outside air volume setting part 24 is brought into a detection state, a prescribed air volume of the ventilation apparatus is decided as outside set air volume E(n).

However, outside set air volume E(n) is not limited to the above. For example, when the human sensor is in a detection state, an air volume smaller than a prescribed air volume may be decided as outside set air volume E(n), or blower 6 may be stopped.

As described above, in the ventilation system of the second exemplary embodiment of the present invention, the respective ventilation apparatuses mutually acquire information from each other, and determine own target air volumes q(n) respectively. That is, second air volume decision part 26 determines its own target air volume q(n) based on total ventilation air volume Q decided by total ventilation air volume determination part 20, preferential air volume P(n) of the installed ventilation apparatus, and outside set air volume E(n) decided by outside air volume setting part 24, and operates the ventilation system. Accordingly, when an air volume is required to be increased for a fixed time due to the setting of outside set air volume E(n), the ventilation apparatuses can increase or decrease their own target air volumes q(n) with respect to total ventilation air volume Q necessary for whole house 30 and hence, an air volume of whole house 30 is maintained at an optimum value.

Third Exemplary Embodiment

In a third exemplary embodiment of the present invention, constitutional elements substantially equal to the constitutional elements of the first exemplary embodiment are given the same symbols, and the detailed description of such constitutional elements is omitted, and only different elements are described. Also in the third exemplary embodiment of the present invention, the description is made by taking first ventilation apparatus 1 as an example with reference to FIG. 12 and FIG. 13.

Calculation buffer 23 of the ventilation apparatus of the third exemplary embodiment stores prescribed air volume S(n) (a rated air volume depending on a case) of its own ventilation apparatus in advance. Further, information transmission part 18 and information reception part 19 transmit and receive prescribed air volume S(n) of its own ventilation apparatus between the ventilation apparatuses in addition to communication ID for identifying a communication counterpart and information on preferential air volume P(n).

In first air volume decision part 21 of the first exemplary embodiment, an air volume of the ventilation apparatus in which a preferential air volume is not set is acquired such that an air volume of the ventilation apparatus in which a preferential air volume is set is subtracted from a total ventilation air volume, and the remaining air volume is equally divided by the number of ventilation apparatuses in which the preferential air volume is not set.

Figure 12:
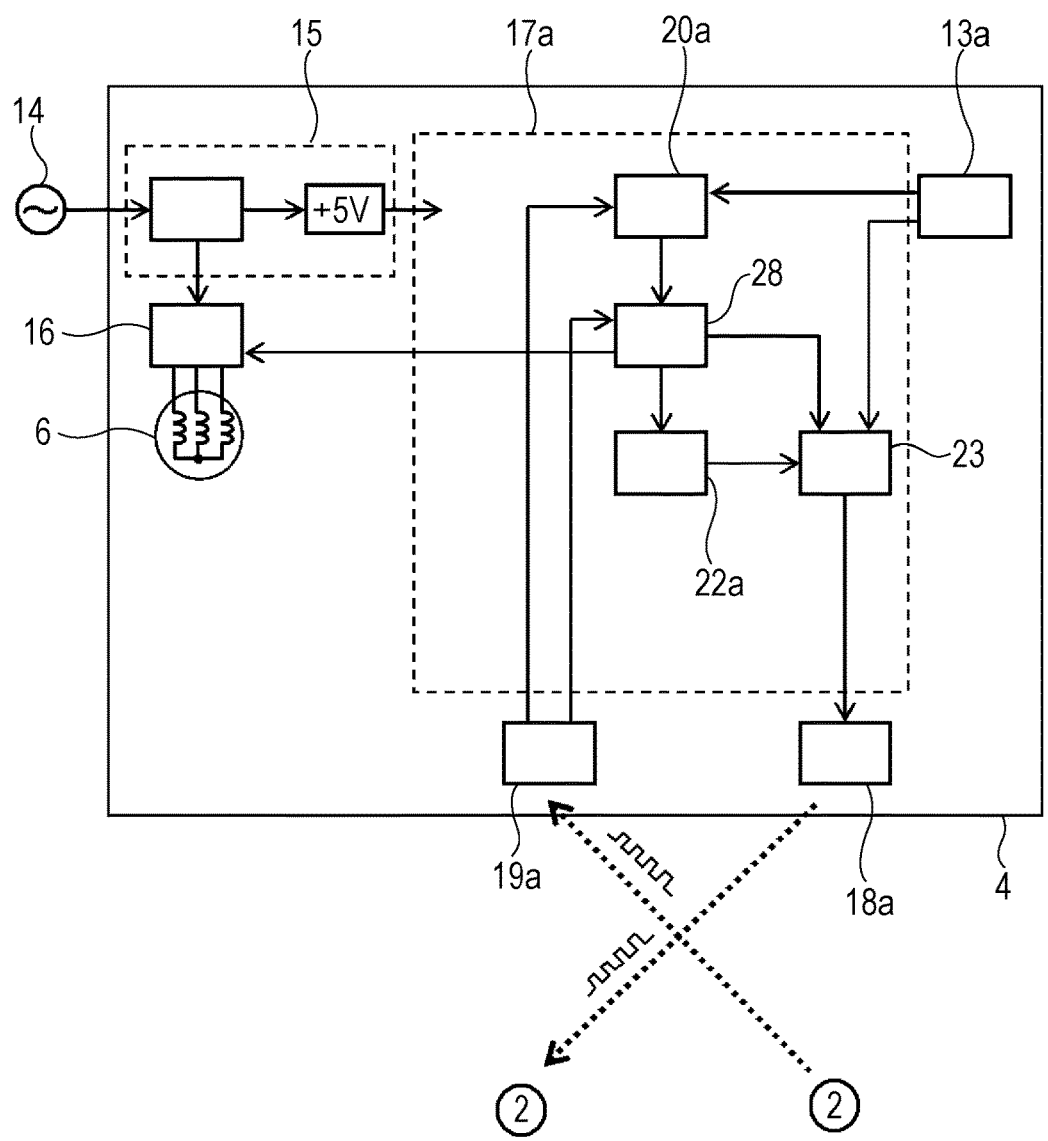
FIG. 12 is a control block diagram of a ventilation apparatus of a third exemplary embodiment of the present invention.

FIG. 12 is a control block diagram of the ventilation apparatus of the third exemplary embodiment of the present invention. As shown in FIG. 12, in place of first-ventilation-apparatus first air volume decision part 21a in the first exemplary embodiment, the ventilation apparatus includes third air volume decision part 28 which sets an air volume corresponding to a first prescribed air volume of first ventilation apparatus 1. Third air volume decision part 28 decides an air volume of first ventilation apparatus 1 by the following method.

Hereinafter, the description is made assuming the case where first ventilation apparatus 1 having a prescribed air volume of 180 [m$^3$/h] and second ventilation apparatus 2 having a prescribed air volume of 75 [m$^3$/h] are installed in house 30 shown in FIG. 1 having a total floor area of 200 [m$^2$].

Figure 13:
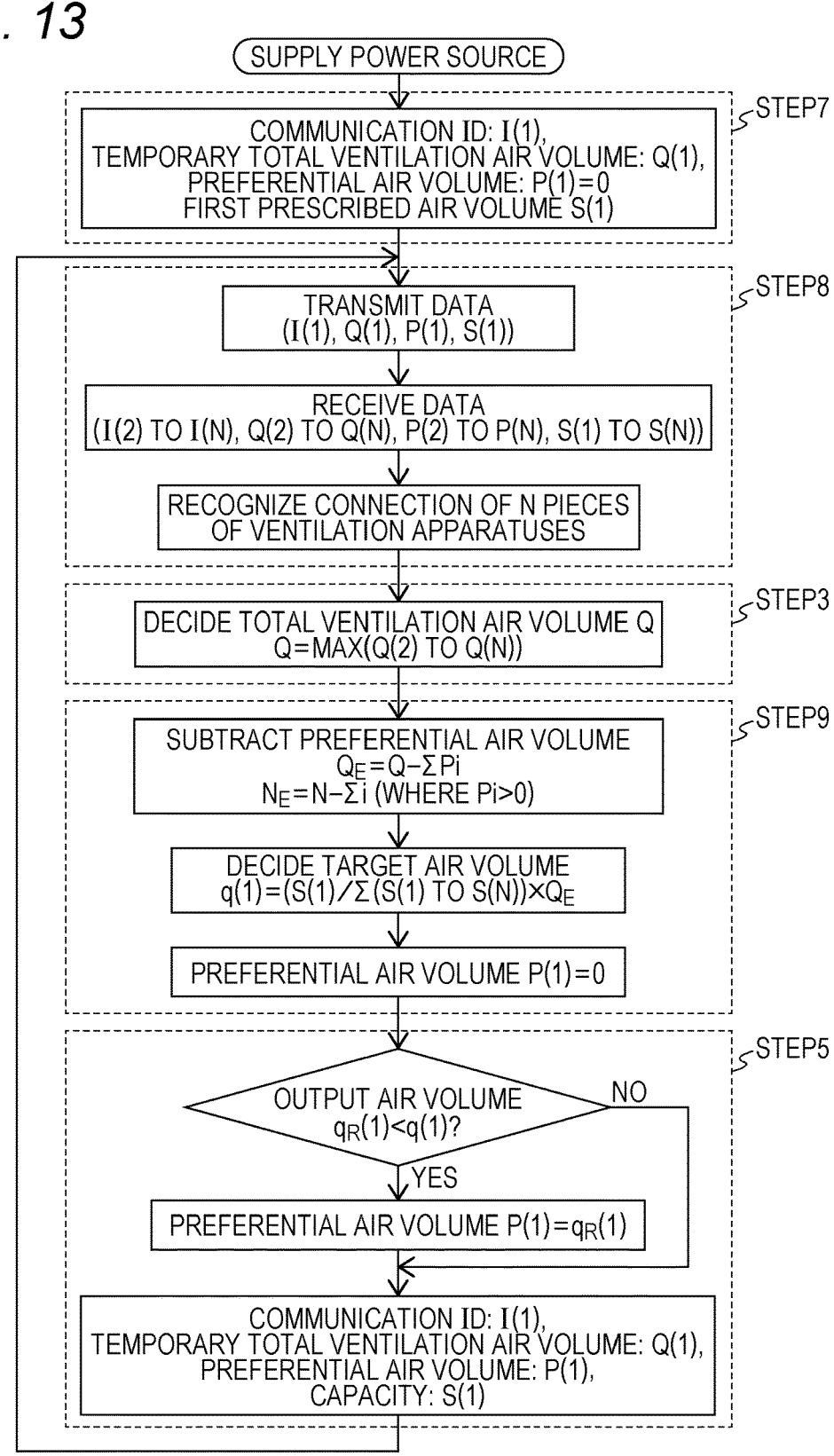
FIG. 13 is a control flowchart of the ventilation apparatus.

With respect to the above-mentioned configuration, the operation of controlling an air volume of the ventilation apparatus is described with reference to a flowchart shown in FIG. 13. FIG. 13 is a control flowchart of the ventilation apparatus of the third exemplary embodiment of the present invention. The flow of the operation of controlling an air volume of first ventilation apparatus 1 can be described in accordance with the following five steps.

That is, the operation of controlling an air volume of the ventilation apparatus of the third exemplary embodiment of the present invention includes: the flow (STEP 7) of storing information on temporary total ventilation air volume Q(1) set by first ventilation apparatus 1, information on initial preferential air volume P(1) (P(1)=0 [m$^3$/h]) and first prescribed air volume S(1) of first ventilation apparatus 1 in calculation buffer 23; the flow (STEP 8) of transmitting information stored in calculation buffer 23 to second ventilation apparatus 2 through first information transmission part 18a shown in FIG. 12 and receiving information from second ventilation apparatus 2 through first information reception part 19a; the flow (STEP 3) showing operations performed by first total ventilation air volume determination part 20a shown in FIG. 12; the flow (STEP 9) showing operations performed by third air volume decision part 28 shown in FIG. 12; and the flow (STEP 5) showing operations performed by first air volume detection part 22a shown in FIG. 12.

Hereinafter, the operation of controlling an air volume of the ventilation apparatus is described in detail.

As shown in STEP 7, when a power source is supplied to first ventilation apparatus 1 and second ventilation apparatus 2, temporary total ventilation air volume Q(1) set by first temporary total ventilation air volume setting part 13a shown in FIG. 12 is stored in calculation buffer 23 in first ventilation apparatus 1. Further, information on initial preferential air volume P(1) (P(1)=0 [m$^3$/h]) is stored in calculation buffer 23. Prescribed air volume S(1) of first ventilation apparatus 1 stored in calculation buffer 23 in advance is recognized.

In this exemplary embodiment, for example, in the same manner as the first exemplary embodiment, first temporary total ventilation air volume setting part 13*a* directly sets temporary total ventilation air volume Q(1) as shown in FIG. 4A. In the third exemplary embodiment, temporary total ventilation air volume Q(1) of 150 [m³/h] (Q(1)=150 [m³/h]) is set by first temporary total ventilation air volume setting part 13*a*. Further, temporary total ventilation air volume Q(2) of 170 [m³/h] (Q(2)=170 [m³/h]) is set by second temporary total ventilation air volume setting part 13*b* of second ventilation apparatus 2. Such information is stored in calculation buffer 23.

Communication ID of first ventilation apparatus 1 is 101 (I(1)=101), and communication ID of second ventilation apparatus 2 is 102 (I(2)=102). Communication ID of first ventilation apparatus 1 and communication ID of second ventilation apparatus 2 are stored in calculation buffer 23 of first ventilation apparatus 1 and calculation buffer 23 of second ventilation apparatus 2 respectively.

0 [m³/h] is stored in calculation buffer 23 as initial preferential air volume P(1) of first ventilation apparatus 1 (P(1)=0 [m³/h]), and 0 [m³/h] is stored in calculation buffer 23 as initial preferential air volume P(2) of second ventilation apparatus 2 (P(2)=0 [m³/h]).

As prescribed air volumes S(n) of the ventilation apparatuses which are stored in calculation buffer 23 in advance, first prescribed air volume S(1) (SW=180 [m³/h]) is recognized with respect to first ventilation apparatus 1, and second prescribed air volume S(2) (S(2)=75 [m³/h]) is recognized with respect to second ventilation apparatus 2.

Next, in STEP 8 in FIG. 13, first information transmission part 18*a* shown in FIG. 12 transmits temporary total ventilation air volume Q(1), preferential air volume P(1), first prescribed air volume S(1) of first ventilation apparatus 1 and information I(1) on communication ID which are set in first ventilation apparatus 1 to second ventilation apparatus 2.

In the same manner, second information transmission part 18*b* transmits temporary total ventilation air volume Q(2), preferential air volume P(2), second prescribed air volume S(2) and information I(2) on communication ID which are set in second ventilation apparatus 2 to first ventilation apparatus 1. As a result, bidirectional communication between first ventilation apparatus 1 and second ventilation apparatus 2 is completed so that respective information on two ventilation apparatuses and the state where two ventilation apparatuses are connected in house 30 are recognized.

Next, in STEP 3 shown in FIG. 13, first total ventilation air volume determination part 20*a* shown in FIG. 12 compares information on temporary total ventilation air volume Q(1) and information on temporary total ventilation air volume Q(2) with each other, and first total ventilation air volume determination part 20*a* recognizes the larger value as total ventilation air volume Q which house 30 is required to have. That is, assume that Q=Q(2)=170 [m³/11].

Next, third air volume decision part 28 shown in FIG. 12 decides an air volume per one ventilation apparatus based on information that two ventilation apparatuses are connected in house 30 which is recognized in STEP 8, information that total ventilation air volume Q necessary for house 30 is 170 [m³/h] (Q=170 [m³/h]), preferential air volume P(2) of second ventilation apparatus 2 received by first information reception part 19*a*, first prescribed air volume S(1) and second prescribed air volume S(2).

In STEP 9 in FIG. 13, third air volume decision part 28 subtracts an air volume of second ventilation apparatus 2 in which preferential air volume P(n) is set from total ventilation air volume Q. Next, the remaining air volume is multiplied by a ratio of first prescribed air volume S(1) of first ventilation apparatus 1 to a sum of first prescribed air volume S(1) and second prescribed air volume S(2), and the air volume obtained by the multiplication is decided as first-ventilation-apparatus target air volume q(1).

Assume that a preferential air volume is not set in first ventilation apparatus 1 so that the preferential air volume is 0 [m³/h]. In this case, both the preferential air volume of first ventilation apparatus 1 and a preferential air volume of second ventilation apparatus 2 are 0 [m³/h] so that no ventilation apparatus is operated with a preferential air volume.

Accordingly, remaining air volume $Q_E$ ($Q_E$=Q=170 [m³/h]) obtained by subtracting the air volume of the ventilation apparatus in which a preferential air volume is set from the total ventilation air volume is multiplied by a ratio of prescribed air volume S(n) of own ventilation apparatus with respect to a sum of prescribed air volumes S(n) of the ventilation apparatuses with respect to each ventilation apparatus, and the obtained air volumes are set as target air volume q(n) of the respective ventilation apparatuses. That is, target air volume q(1) of first ventilation apparatus 1 is 120 [m³/h] (q(1)=S(1)/(S(1)+S(2))×Q=180/(180+75)×170=120 [m³/h]), and target air volume q(2) of second ventilation apparatus 2 is 50 [m³/h] (q(2)=S(2)/(S(1)+S(2))×Q=75/(180+75)×170=50 [m³/h]).

In both first ventilation apparatus 1 and second ventilation apparatus 2, third air volume decision part 28 performs the same operation and hence, preferential air volume P(n) is not set in first ventilation apparatus 1 and second ventilation apparatus 2. Accordingly, 0 [m³/h] is stored in calculation buffer 23 as a preferential air volume of first ventilation apparatus 1 and a preferential air volume of second ventilation apparatus 2 (P(1)=P(2)=0 [m³/h]).

Accordingly, the total ventilation air volume is 170 [m³/h] ($q_R$(1)+$q_R$(2)=120+50=170 [m³/h]) and hence, total ventilation air volume Q of 170 [m³/h] (Q=170 [m³/h]) is satisfied.

In first air volume detection part 22*a* shown in FIG. 12, when an air volume which blower 6 actually outputs is smaller than an air volume of first ventilation apparatus 1 set in blower 6 and a preferential air volume is set, an air volume is adjusted in STEP 9 shown in FIG. 13. The adjustment is substantially equal to the adjustment performed in STEP 4 shown in FIG. 6 and hence, the description of such adjustment is omitted.

The third exemplary embodiment is characterized in that the ventilation apparatus of the first exemplary embodiment is further configured such that an air volume can be set also corresponding to a prescribed air volume of the ventilation apparatus. However, the third exemplary embodiment may be also characterized in that the ventilation apparatus of the second exemplary embodiment is further configured such that an air volume can be set also corresponding to a prescribed air volume of the ventilation apparatus.

The description has been made with respect to the case where the ventilation system includes two ventilation apparatuses heretofore. However, the third exemplary embodiment is also applicable to the ventilation system which includes three or more ventilation apparatuses. That is, first ventilation apparatus 1 and mth ventilation apparatus M respectively store a first prescribed air volume and an mth prescribed air volume acquired when first ventilation apparatus 1 and mth ventilation apparatus M are operated with maximum capacities respectively. First-ventilation-apparatus first air volume decision part 21*a* sets an air volume acquired by multiplying a total ventilation air volume by a ratio of the first prescribed air volume as a first-ventilation-apparatus target air volume. mth-ventilation-apparatus first air volume decision part 21m sets an air volume acquired by multiplying a total ventilation air volume by a ratio of mth prescribed air volume as an mth-ventilation-apparatus target air volume.

First information transmission part 18a transmits information on the first prescribed air volume, and first information reception part 19a receives information on the mth prescribed air volume. First total ventilation air volume determination part 20a sets a sum of a mth prescribed air volume and a first prescribed air volume as a total ventilation air volume. mth information transmission part 18m transmits information on an mth prescribed air volume, and mth information reception part 19m receives information on prescribed air volumes ranging from a first prescribed air volume to a (m−1)th prescribed air volume and prescribed air volumes ranging from a (m+1)th prescribed air volume to a nth prescribed air volume. mth total ventilation air volume determination part 20m sets a sum of an mth prescribed air volume and a first prescribed air volume as a total ventilation air volume.

As has been described above, in the ventilation apparatuses of the third exemplary embodiment of the present invention, the respective ventilation apparatuses mutually acquire information from each other. Accordingly, the ventilation apparatus of the third exemplary embodiment of the present invention determines its own ventilation air volume based on information on a total ventilation air volume decided by total ventilation air volume determination part 20, information on a preferential air volume having priority over a set air volume of the installed ventilation apparatus and a prescribed air volume of the ventilation apparatus, and the ventilation apparatus is operated with the determined own ventilation air volume. Accordingly, in the case where ventilation apparatuses having different prescribed air volumes with respect to a total ventilation air volume necessary for whole house 30 are installed, even when ventilation capacities of the respective ventilation apparatuses are excessively large or excessively small, the ventilation apparatuses can increase or decrease their own air volumes corresponding to the prescribed air volumes of the ventilation apparatuses so that an air volume of whole house 30 is maintained at an optimum value.

Fourth Exemplary Embodiment

Figure 14:
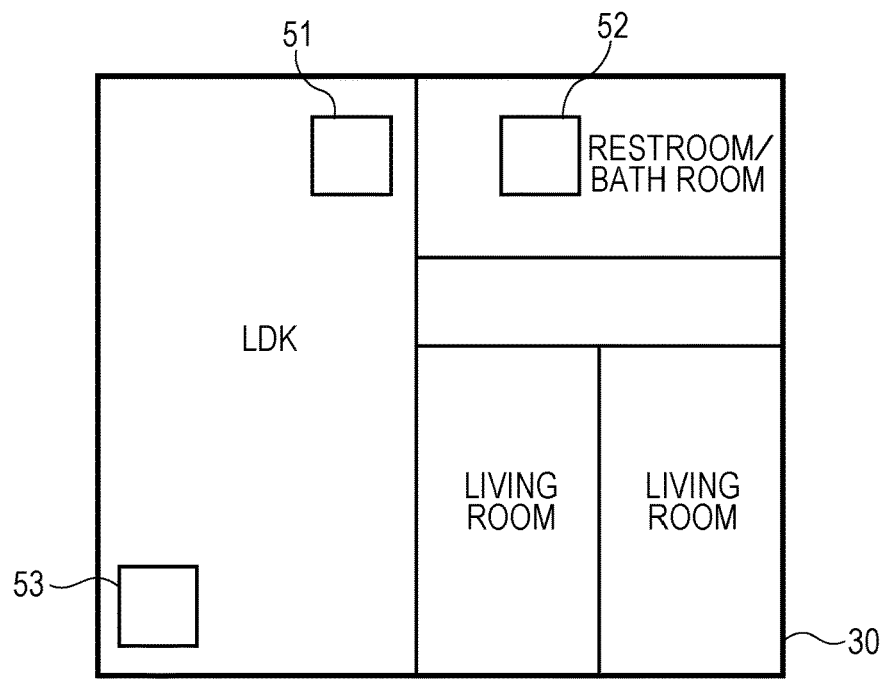
FIG. 14 is a view showing an installation example of a ventilation system constituted of ventilation apparatuses of a fourth exemplary embodiment of the present invention.

In a fourth exemplary embodiment of the present invention, constitutional elements substantially equal to the constitutional elements of the first to third exemplary embodiments are given the same symbols, and the detailed description of such constitutional elements is omitted, and only different elements are described. FIG. 14 is a view showing an installation example of a ventilation system constituted of ventilation apparatuses of the fourth exemplary embodiment of the present invention. As shown in FIG. 14, in the ventilation system of the fourth exemplary embodiment of the present invention, three ventilation apparatuses are installed in house 30. That is, the ventilation system further includes third ventilation apparatus 53 in addition to first ventilation apparatus 51 and second ventilation apparatus 52. First ventilation apparatus 51 and third ventilation apparatus 53 are installed in the same area, that is, an LDK (living room, dining room and kitchen), and second ventilation apparatus 52 is installed in a different area, that is, a restroom/bath room. In this exemplary embodiment, first ventilation apparatus 51, second ventilation apparatus 52 and third ventilation apparatus 53 have the same configuration. Accordingly, the description is made by taking first ventilation apparatus 51 as an example with reference to FIG. 15 to FIG. 18.

Figure 15:
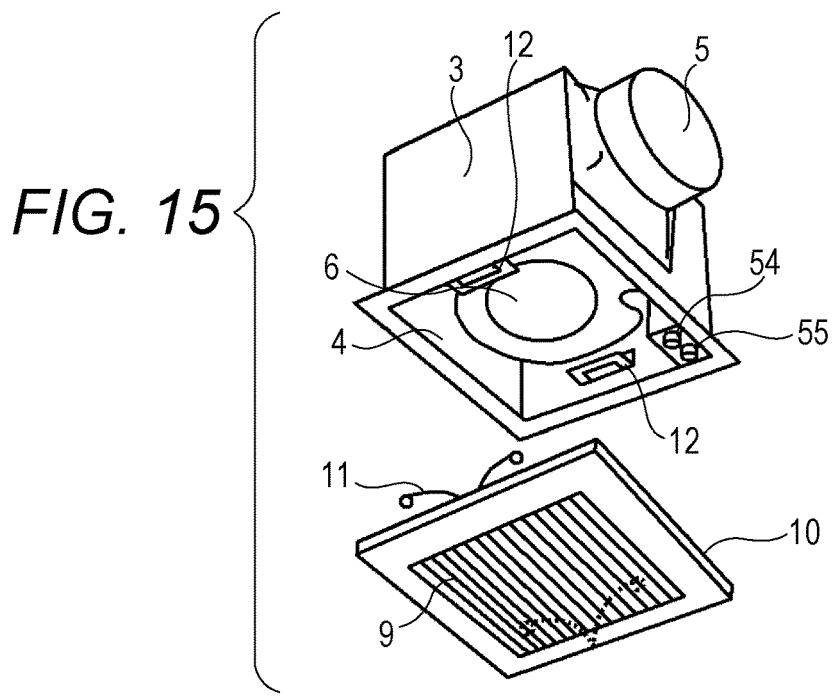
FIG. 15 is an exploded perspective view of the ventilation apparatus.

FIG. 15 is an exploded perspective view of the ventilation apparatus of the fourth exemplary embodiment of the present invention. As shown in FIG. 15, the fourth exemplary embodiment is characterized in that floor area setting part 54 and area setting part 55 are disposed at positions where a user can easily observe and operate floor area setting part 54 and area setting part 55 when decorative plate 10 is removed.

Floor area setting part 54 sets a roughly estimated value of a total floor area of whole house 30 in which the ventilation apparatuses are installed. Floor area setting part 54 may be formed of a rotary dial type switch which can set the total floor area of house 30 at multiple stages. However, floor area setting part 54 is not limited to a rotary dial type switch, and it is sufficient that floor area setting part 54 can set a total floor area of house 30 by switching.

Figure 16:
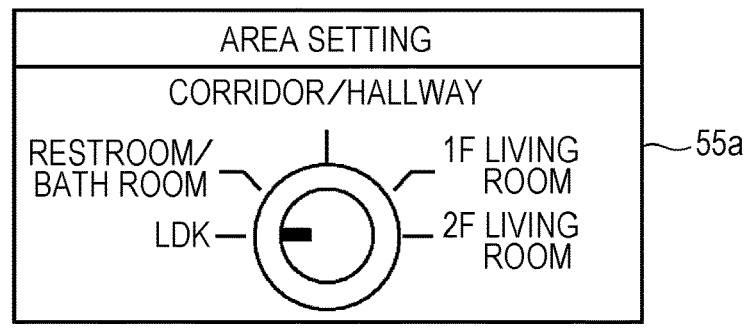
FIG. 16 is an external appearance view showing an outside air volume setting part of the ventilation apparatus.

FIG. 16 is an external appearance view showing an outside air volume setting part of the ventilation apparatus of the fourth exemplary embodiment of the present invention. As shown in FIG. 16, first area setting part 55a sets a place where the ventilation apparatus is installed. First area setting part 55a may adopt any method by which the place where the ventilation apparatus is installed can be switched such as a method in which the place where the ventilation apparatus is installed is switched by a rotary dial type switch (FIG. 16) or a method in which the installation place is switched by a DIP (Dual In-line Package) switch.

Figure 17:
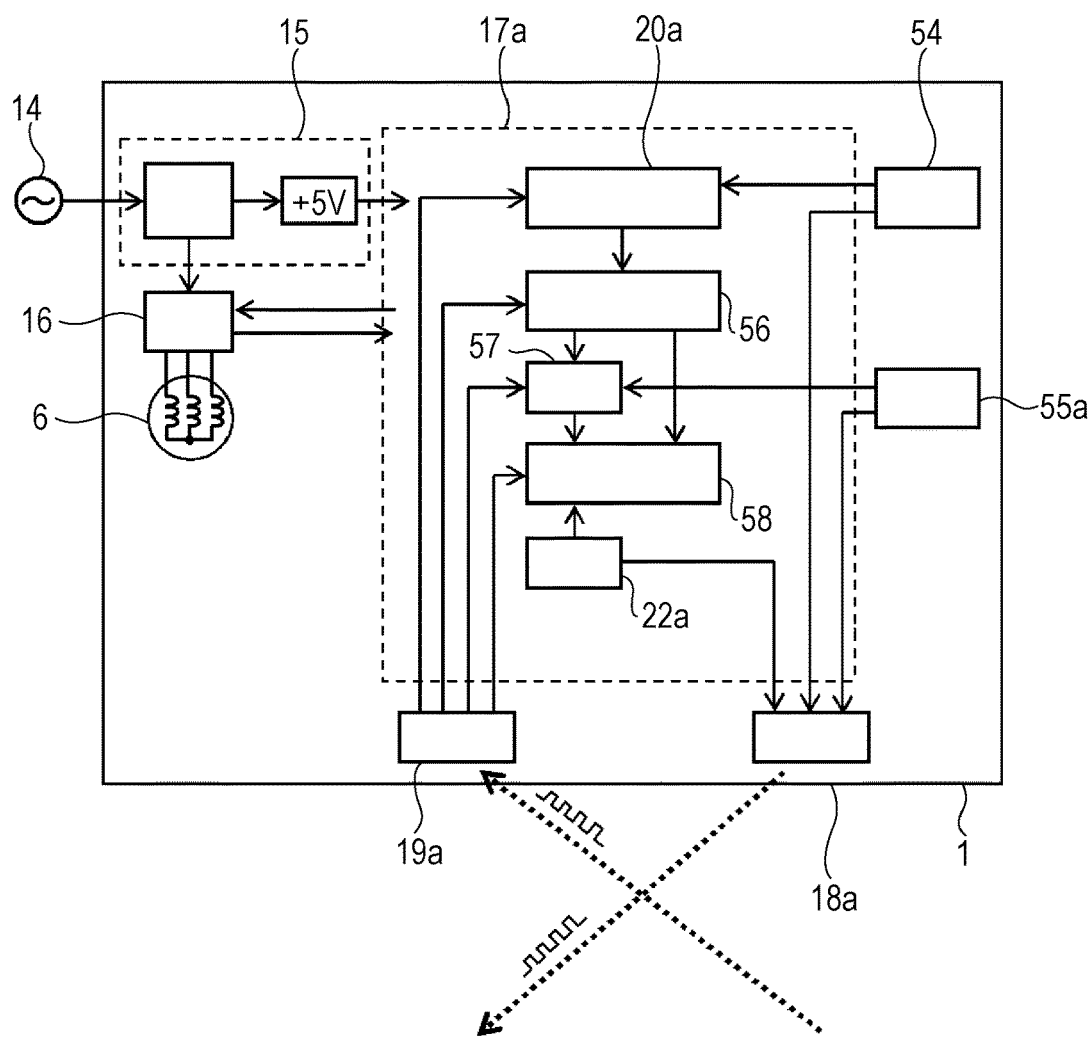
FIG. 17 is a control block diagram of the ventilation apparatus.

FIG. 17 is a control block diagram of the ventilation apparatus of the fourth exemplary embodiment of the present invention. As shown in FIG. 17, the control circuit of the fourth exemplary embodiment shown in the block diagram includes: floor area setting part 54 which sets information on a total floor area of house 30; and first area setting part 55a which sets area information on a place where first ventilation apparatus 51 is installed. Power source circuit 15, drive IC 16, floor area setting part 54, first area setting part 55a, first information transmission part 18a and first information reception part 19a are connected to first control part 17a. A total ventilation air volume necessary for house 30 which corresponds to a total floor area set by floor area setting part 54 is stored in a CPU in first control part 17a.

First control part 17a includes: first air volume detection part 22a; first total ventilation air volume determination part 20a; fourth air volume decision part 56; inter-area ventilation air volume decision part 57; and fifth air volume decision part 58. First air volume detection part 22a detects actual first-ventilation-apparatus output air volume $q_R(1)$ of first ventilation apparatus 51. First total ventilation air volume determination part 20a determines total ventilation air volume Q necessary for the inside of house 30. Fourth air volume decision part 56 decides a ventilation air volume per one ventilation apparatus as air volume q(1) of first ventilation apparatus 51. Inter-area ventilation air volume decision part 57 decides a ventilation air volume necessary for an area where first ventilation apparatus 51 is installed (inter-area ventilation air volume QAr(1)). Fifth air volume decision part 58 newly decides air volume qN(1) of first ventilation apparatus 51 in preference over the air volume decided by fourth air volume decision part 56.

First information transmission part 18a includes a memory buffer for transmission. Information on the total floor area of house 30 set by floor area setting part 54, area information on the installation place set by first area setting part 55a; and information on the actual air volume of first ventilation apparatus 51 detected by first air volume detection part 22a are stored in the memory buffer. First information reception part 19a includes a memory buffer for reception of signals. Information on total floor areas, area information and information on air volumes which are transmitted from second ventilation apparatus 52 and third ventilation apparatus 53 are stored in the memory buffer.

First total ventilation air volume determination part 20a compares information on the total floor area set by floor area setting part 54 of first ventilation apparatus 51 and information on the total floor area relating to second ventilation apparatus 52 and third ventilation apparatus 53 stored in the memory buffer of first information reception part 19a with each other. First total ventilation air volume determination part 20a recognizes information on the largest total floor area as a total floor area of house 30, extracts information on the air volume corresponding to the total floor area which is stored in the CPU in advance, and sets the air volume as required total ventilation air volume Q.

Fourth air volume decision part 56 specifies the number of ventilation apparatuses installed in house 30 based on information on second ventilation apparatus 52 and third ventilation apparatus 53 stored in the memory buffer of first information reception part 19a. Based on information on the number of ventilation apparatuses and information on the total ventilation air volume decided by first total ventilation air volume determination part 20a, fourth air volume decision part 56 decides a ventilation air volume per one ventilation apparatus as air volume q(1) of first ventilation apparatus 51, and transmits the air volume q(1) to inter-area ventilation air volume decision part 57 and fifth air volume decision part 58.

Inter-area ventilation air volume decision part 57 firstly recognizes ventilation apparatuses installed in the same area as first ventilation apparatus 51 based on area information on second ventilation apparatus 52 and third ventilation apparatus 53 stored in the memory buffer of first information reception part 19a. Next, inter-area ventilation air volume decision part 57 specifies ventilation air volume q(1) per one ventilation apparatus and the number of ventilation apparatuses in the same area decided by fourth air volume decision part 56. Then, air volumes q(n) of the ventilation apparatuses in the same area are summed thus deciding inter-area ventilation air volume QAr(1) necessary for the area where first ventilation apparatus 51 is installed.

Fifth air volume decision part 58 calculates excess or deficiency of the air volume with respect to inter-area ventilation air volume QAr(1) based on inter-area ventilation air volume QAr(1), actual air volume $q_R(1)$ of first ventilation apparatus 51 detected by first air volume detection part 22a, actual output air volume $q_R(3)$ of third ventilation apparatus 53 in the same area as first ventilation apparatus 51 which is stored in the memory buffer of first information reception part 19a, and ventilation air volume q(1) per one ventilation apparatus which is decided by fourth air volume decision part 56, Then, fifth air volume decision part 58 recognizes ventilation apparatuses each of which is operated with an air volume equal to ventilation air volume q(n) per one ventilation apparatus, that is, ventilation apparatuses each of which is operated with a prescribed air volume. Fifth air volume decision part 58 specifies the number of ventilation apparatuses operated with the prescribed air volume based on such information, and newly decides air volume qN(1) of first ventilation apparatus 51 such that inter-area ventilation air volume QAr(1) is maintained based on the excess or deficiency of the air volume and the number of ventilation apparatuses operated with the prescribed air volume, and an air volume of blower 6 is adjusted through drive IC 16.

Figure 18:
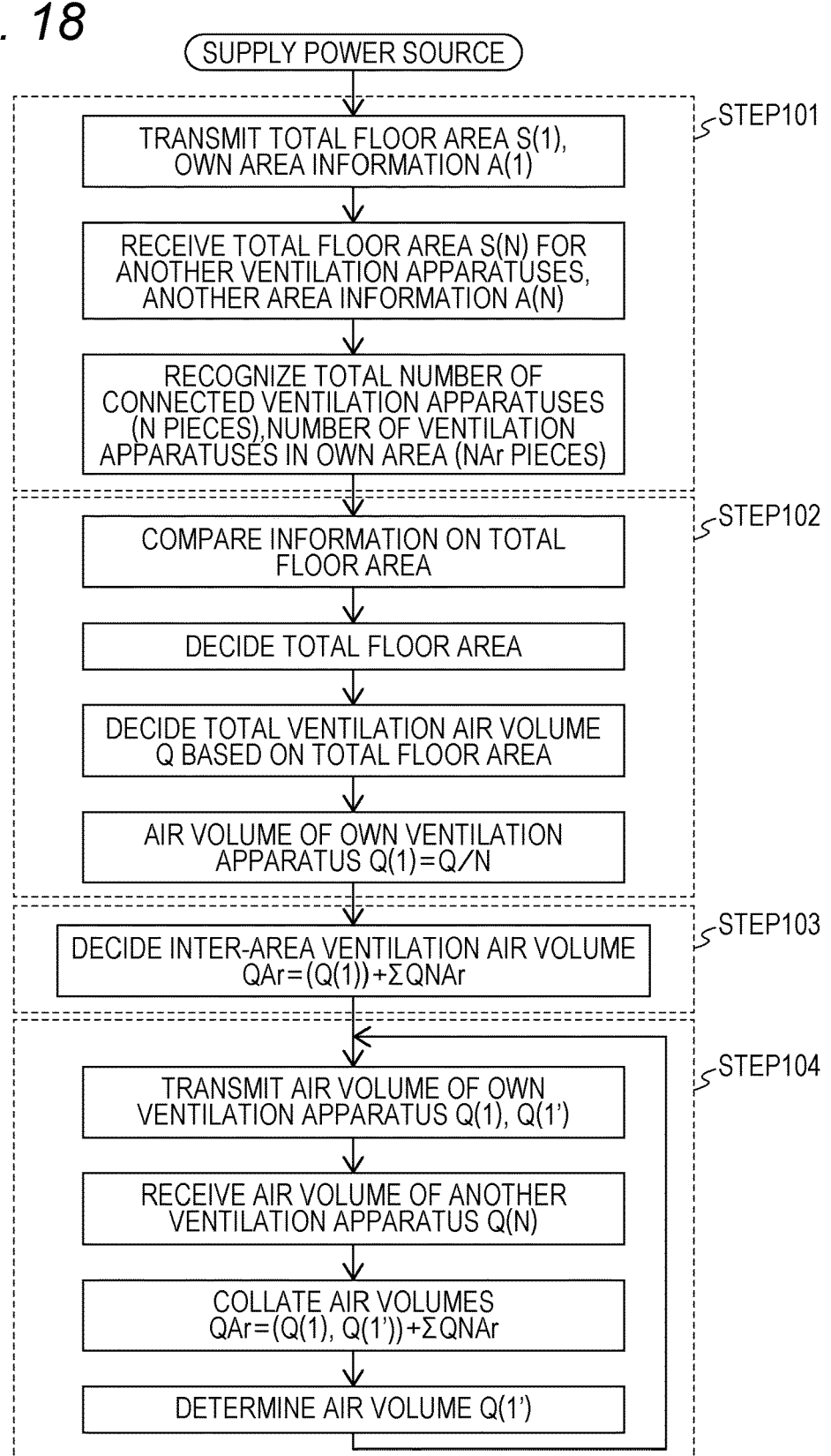
FIG. 18 is a control flowchart of the ventilation apparatus.

The description is made with respect to the operation of controlling air volumes of the ventilation apparatuses having the above-mentioned configuration with reference to a flowchart of first ventilation apparatus 51 shown in FIG. 18. FIG. 18 is a control flowchart of the ventilation apparatus of the fourth exemplary embodiment of the present invention.

Firstly, in STEP 101, first information reception part 19a shown in FIG. 17 acquires floor area information S(1), S(N) relating to second ventilation apparatus 52 and third ventilation apparatus 53 and area information A(1), A(N) set by first area setting part 55a.

In STEP 102, first total ventilation air volume determination part 20a shown in FIG. 17 decides total ventilation air volume Q based on a total floor area. Further, fourth air volume decision part 56 decides ventilation air volume Q(1) per one ventilation apparatus as an air volume of first ventilation apparatus 51 based on acquired total ventilation air volume Q.

In STEP 103, inter-area ventilation air volume decision part 57 shown in FIG. 17 decides ventilation air volume QAr(1) in the area where first ventilation apparatus 51 is installed.

In STEP 104, fifth air volume decision part 58 shown in FIG. 17 newly decides air volume Q(1') of first ventilation apparatus 51 based on information on the air volume of first ventilation apparatus 51 and information on the air volume of third ventilation apparatus 53 installed in the same area as first ventilation apparatus 51. In this exemplary embodiment, the case is assumed where three ventilation apparatuses having the same specification including the largest air volume capacity of 100 $[m^3/h]$ are installed in house 30 having a total floor area of 500 $m^2$. The case is described in detail hereinafter.

When a power source is supplied to first ventilation apparatus 51, second ventilation apparatus 52 and third ventilation apparatus 53, in STEP 101 shown in FIG. 18, first total ventilation air volume determination part 20a shown in FIG. 17 reads floor area information S(1) set by floor area setting part 54. Further, inter-area ventilation air volume decision part 57 reads area information A(1) set by first area setting part 55a. Floor area information S(1) and area information A(1) which are read in this manner are transmitted to second ventilation apparatus 52 and third ventilation apparatus 53 through first information transmission part 18a.

In this exemplary embodiment, assume that a floor area setting value of first ventilation apparatus 51 is set to 451 $[m^2]$ to 600 $[m^2]$ (SW=451 $[m^2]$ to 600 $[m^2]$), and area setting is made to an LDK (A(1)=LDK), for example. The description is made with respect to the case where a floor area setting value of second ventilation apparatus 52 is set to 451 $[m^2]$ to 600 $[m^2]$ (S(2)=451 $[m^2]$ to 600 $[m^2]$), area setting is made to a restroom/bath room (A(2)=restroom/bath room), a floor area setting value of third ventilation apparatus 53 is set to a value up to 150 $[m^2]$ (S(3)=a value up to 150 $[m^2]$), and area setting is made to an LDK (A(3)=LDK).

First ventilation apparatus 51 transmits floor area information S(1) and area information A(1) to second ventilation apparatus 52 and third ventilation apparatus 53. In the same manner, second ventilation apparatus 52 transmits floor area information S(2) and area information A(2) to first ventilation apparatus 51 and third ventilation apparatus 53, and third ventilation apparatus 53 transmits floor area information S(3) and area information A(3) to first ventilation apparatus 51 and second ventilation apparatus 52 thus completing the bidirectional communication. These information are stored in memory buffers of first information reception part 19a, second information reception part 19b and third information reception part 19c respectively. These information are inputted to first total ventilation air volume determination part 20a, second total ventilation air volume determination part 20b, third total ventilation air volume determination part 20c, and inter-area ventilation air volume decision part 57 respectively. Fourth air volume decision part 56 shown in FIG. 17 recognizes that three ventilation apparatuses are connected in house 30 based on information stored in first information reception part 19a, second information reception part 19b and third information reception part 19c.

Further, inter-area ventilation air volume decision part 57 of first ventilation apparatus 51 and inter-area ventilation air volume decision parts 57 of third ventilation apparatus 53 recognize that two ventilation apparatuses are connected in an LDK area. On the other hand, second ventilation apparatus 52 recognizes that one ventilation apparatus is connected in a restroom/bath room area.

Next, the operation of first total ventilation air volume determination part 20a and fourth air volume decision part 56 shown in FIG. 17 in STEP 102 shown in FIG. 18 is described.

First total ventilation air volume determination part 20a compares total floor area information S(1) set by floor area setting part 54 of first ventilation apparatus 51, information on total floor area S(2) which is received by first information reception part 19a and set in second ventilation apparatus 52, and information on total floor area S(3) set in third ventilation apparatus 53 with each other. Information on the largest value (in this exemplary embodiment, S(1)=S(3)= 451 [m$^2$] to 600 [m$^2$]) is recognized as information on the total floor area of house 30.

Table data in which a total ventilation air volume and a total floor area are made to correspond to each other are stored in the first control part 17a shown in FIG. 17. Based on such table data, the total floor area is converted into the total ventilation air volume Q necessary for house 30 of 210 [m$^3$/h] (Q=210 [m$^3$/h]) corresponding to (S(1)=S(3)=451 to 600 [m$^2$]).

The largest air volume capacities of first ventilation apparatus 51, second ventilation apparatus 52 and third ventilation apparatus 53 are 100 [m$^3$/h] respectively. Accordingly, when three ventilation apparatuses are simultaneously operated with the maximum capacity, air volume becomes 300 [m$^3$/h] so that the ventilation system is brought into an air volume excess state with respect to required total ventilation air volume (Q=210 [m$^3$/h]) by 90 [m$^3$/11].

Fourth air volume decision part 56 acquires air volume Q(1) per one ventilation apparatus (Q(1)=Q/N=210/3=70 [m$^3$/h]) based on information on the number (three pieces) of ventilation apparatuses connected in house 30, and information that total ventilation air volume Q is 210 [m$^3$/h] (Q=210 [m$^3$/h]).

Next, the operation of inter-area ventilation air volume decision part 57 shown in FIG. 17 in STEP 103 shown in FIG. 18 is described. Based on information on the number of ventilation apparatuses connected in the same area and information on air volume Q(n) per one ventilation apparatus, inter-area ventilation air volume decision part 57 decides inter-area ventilation air volume QAr(n) necessary for the inside of the area. That is, first ventilation apparatus 51 and third ventilation apparatus 53 acquire inter-area ventilation air volume QAr(1) of 140 [m$^3$/h] (QAr(1)=70+ 70=140 [m$^3$/h]) necessary for the inside of an LDK area based on information on the number (two pieces) of ventilation apparatuses installed in the LDK area and information on an air volume per one ventilation apparatus (Q(1)=Q(3)= Q/N=70 [m$^3$/h]).

Second ventilation apparatus 52 sets inter-area ventilation air volume QAr(2) of 70 [m$^3$/h] (QAr(2)=70 [m$^3$/h]) necessary for a restroom/bath room area based on information that one ventilation apparatus is connected in the restroom/bath room area, and information that an air volume per one ventilation apparatus is 70 [m$^3$/h] (Q(2)=Q/N=70 [m$^3$/h]).

Next, the operation of fifth air volume decision part 58 shown in FIG. 17 in STEP 104 shown in FIG. 18 is described. In this exemplary embodiment, one end of a duct is connected to indoor air discharge opening portion 5 shown in FIG. 15. Further, in general, the other end of the duct extends to a discharge opening leading to the outside of the house. A pressure loss is increased or decreased depending on a length of the duct so that there may be a case where a predetermined air volume which is set initially cannot be ensured. For example, there may be a case where the duct of third ventilation apparatus 53 is installed with a length larger than an allowable value in terms of design so that third ventilation apparatus 53 can exhibit only a capacity that air volume $Q_R(3)$ of 55 [m$^3$/h] ($Q_R(3)$=55 [m$^3$/h]).

Actual first-ventilation-apparatus output air volume $q_R(1)$ of first ventilation apparatus 51 is detected by first air volume detection part 22a. First-ventilation-apparatus output air volume $q_R(1)$ is transmitted to second ventilation apparatus 52 and third ventilation apparatus 53 through first information transmission part 18a. On the other hand, actual output air volumes $q_R(3)$ of second ventilation apparatus 52 and third ventilation apparatus 53 are stored in the memory buffer of first information reception part 19a.

In first ventilation apparatus 51, fifth air volume decision part 58 calculates excess or deficiency of the air volume in the area based on inter-area ventilation air volume QAr(1), first-ventilation-apparatus output air volume $q_R(1)$, and output air volumes $q_R(3)$ of third ventilation apparatus 53.

In STPE 102 in FIG. 18, based on information on the air volume per one ventilation apparatus decided by fourth air volume decision part 56 shown in FIG. 17, it is recognized that the number of ventilation apparatuses operated with a prescribed air volume is one, that is, the ventilation apparatuses operated with a prescribed air volume is first ventilation apparatus 51. The recognition steps are as follows. Excess or deficiency of the air volume dQAr in the LDK area is calculated based on information that inter-area ventilation air volume QAr(1) required in the LDK area is 140 [m$^3$/h] (QAr(1)=140 [m$^3$/h]), information that air volume Q(1) of first ventilation apparatus 51 is 70 [m$^3$/h] (Q(1)=70 [m$^3$/h]), and air volume Q(3) of third ventilation apparatus 53 is 55 [m$^3$/h] (Q(3)=55 [m$^3$/h]). That is, excess or deficiency of the air volume dQAr is 15 [m$^3$/h] (dQAr=QAr (1)−(Q(1)+Q(3))=140−(70+55)=15 [m$^3$/h]). Accordingly, it is determined that the air volume is deficient by 15 [m$^3$/h]. It is also recognized that the number ns of the ventilation apparatuses operated with a prescribed air volume is one (ns=1).

Next, based on excess or deficiency of the air volume dQAr and the number ns of ventilation apparatuses operated with a prescribed air volume, an air volume of first ventilation apparatus 51 is adjusted such that inter-area ventilation air volume QAr(1) necessary for the LDK area becomes 140 [m$^3$/h]. That is, air volume Qne(1) of first ventilation apparatus 51 is 85 [m$^3$/h] (Qne(1)=Q(1)+dQAr/ns=70+15/ 1=85 [m$^3$/h]). In this manner, the air volume of first ventilation apparatus 51 is decided such that the ventilation air volume in the LDK area is maintained at a fixed value.

On the other hand, in third ventilation apparatus 53, detected air volume Q(3) is 55 [m³/h] (Q(3)=55 [m³/h]) so that fifth air volume decision part 58 adjusts an output of blower 6 based on information on an air volume per one ventilation apparatus decided by fourth air volume decision part 56.

In the fourth exemplary embodiment, the description has been made with respect to the case where the ventilation system includes three ventilation apparatuses. However, substantially the same advantageous effect can be acquired also when the ventilation system includes four or more ventilation apparatuses. That is, first ventilation apparatus 51 and mth ventilation apparatus M include floor area setting part 54 which sets a total floor area of house 30 respectively. First information transmission part 18a and mth information transmission part 18m respectively transmit information on the set total floor area. First information reception part 19a receives information on the total floor area set by mth ventilation apparatus M. mth information reception part 19m receives information on the total floor area set by ventilation apparatuses ranging from first ventilation apparatus 51 to (m−1)th ventilation apparatus (M−1) and ventilation apparatuses ranging from (m+1)th ventilation apparatus (M+1) to nth ventilation apparatus N. First total ventilation air volume determination part 20a and mth total ventilation air volume determination part 20m calculate the total ventilation air volume based on the largest total floor area among the total floor areas respectively.

First ventilation apparatus 1 and mth ventilation apparatus M respectively include first area setting part 55a which sets the place for installing first ventilation apparatus 51 and mth area setting part 55m which sets the place for installing mth ventilation apparatus M. First total ventilation air volume determination part 20a and mth total ventilation air volume determination part 20m decide a total ventilation air volume for respective area information set by first area setting part 55a and mth area setting part 55m respectively.

As has been described above, in the fourth exemplary embodiment, the respective ventilation apparatuses mutually acquire information from each other so that the ventilation apparatuses determine their own ventilation air volumes based on information acquired by inter-area ventilation air volume decision part 57 and information on an air volume and the number of ventilation apparatuses installed in the same area, and the respective ventilation apparatuses are operated with their determined own ventilation air volume. Even when ventilation capacities of the respective ventilation apparatuses are in an excess state with respect to the inter-area ventilation air volume required in the same area, the adjustment can be performed such that the ventilation apparatuses reduce their own air volumes. Accordingly, the increase or the decrease of the ventilation air volume in the same area is eliminated so that the air volume in the same area is maintained at an optimum value and, at the same time, the total ventilation air volume in house 30 is ensured.

In the fourth exemplary embodiment, first total ventilation air volume determination part 20a, second total ventilation air volume determination part 20b and third total ventilation air volume determination part 20c respectively set the largest total floor area among information on the total floor areas set with respect to the respective ventilation apparatuses as the total floor area of house 30. However, the total floor area of house 30 may be decided by another method. For example, the total floor area of house 30 may be set based on information which is set the largest number of times with respect to the installed ventilation apparatus.

Fifth Exemplary Embodiment

In a fifth exemplary embodiment of the present invention, constitutional elements substantially equal to the constitutional elements of the first to fourth exemplary embodiments are given the same symbols, and the detailed description of such constitutional elements is omitted, and only different elements are described. In the ventilation system of the fifth exemplary embodiment of the present invention, in the same manner as the fourth exemplary embodiment, three ventilation apparatuses are installed in house 30. That is, the ventilation system includes: first ventilation apparatus 51; second ventilation apparatus 52; and third ventilation apparatus 53. Further, the description is made by taking first ventilation apparatus 51 as an example with reference to FIG. 19A, FIG. 19B and FIG. 20.

Figure 19A:
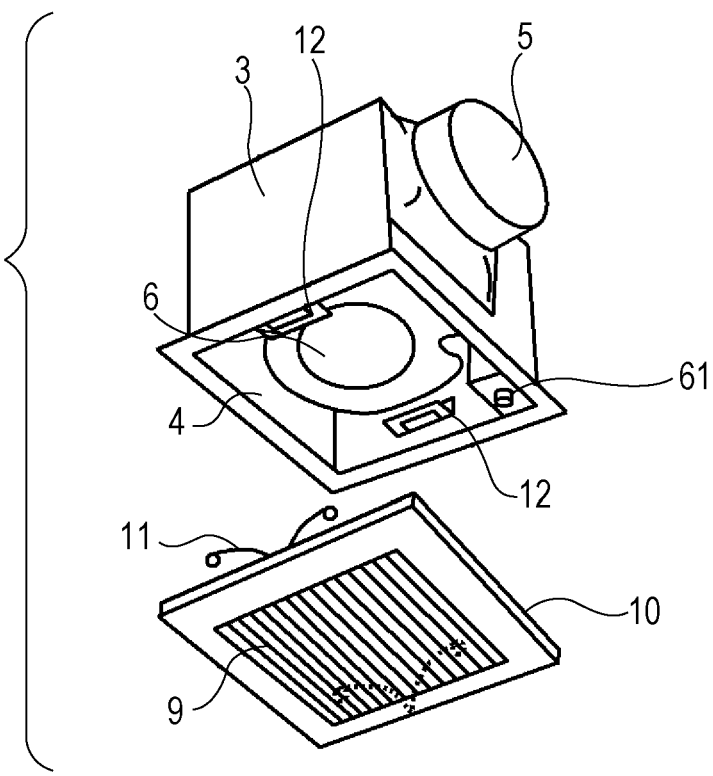
FIG. 19A is an exploded perspective view of a ventilation apparatus of a fifth exemplary embodiment of the present invention.
Figure 19B:
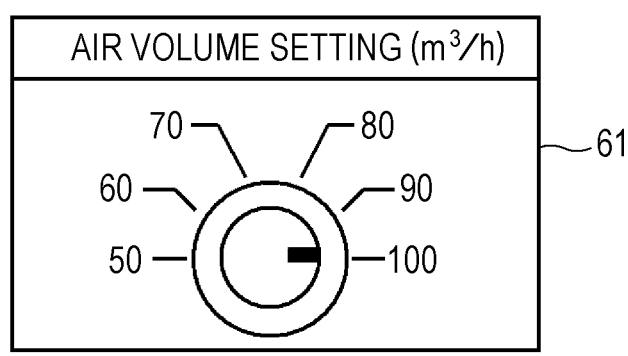
FIG. 19B is an external appearance view showing an air volume setting part of the ventilation apparatus.

FIG. 19A is an exploded perspective view of the ventilation apparatus which constitutes the ventilation system of the fifth exemplary embodiment of the present invention, and FIG. 19B is an external appearance view showing an air volume setting part of the ventilation apparatus which constitutes the ventilation system. As shown in FIG. 19A, air volume setting part 61 is mounted at a position where a user can easily observe and operate air volume setting part 61 when decorative plate 10 is removed.

Air volume setting part 61 sets an air volume (set air volume $q(1)$) of first ventilation apparatus 51. As shown in FIG. 19B, air volume setting part 61 is formed of a rotary dial type switch which can set an air volume at multiple stages (or continuously). However, air volume setting part 61 is not limited to a rotary dial type switch, and it is sufficient that air volume setting part 61 can set an air volume by switching.

Figure 20:
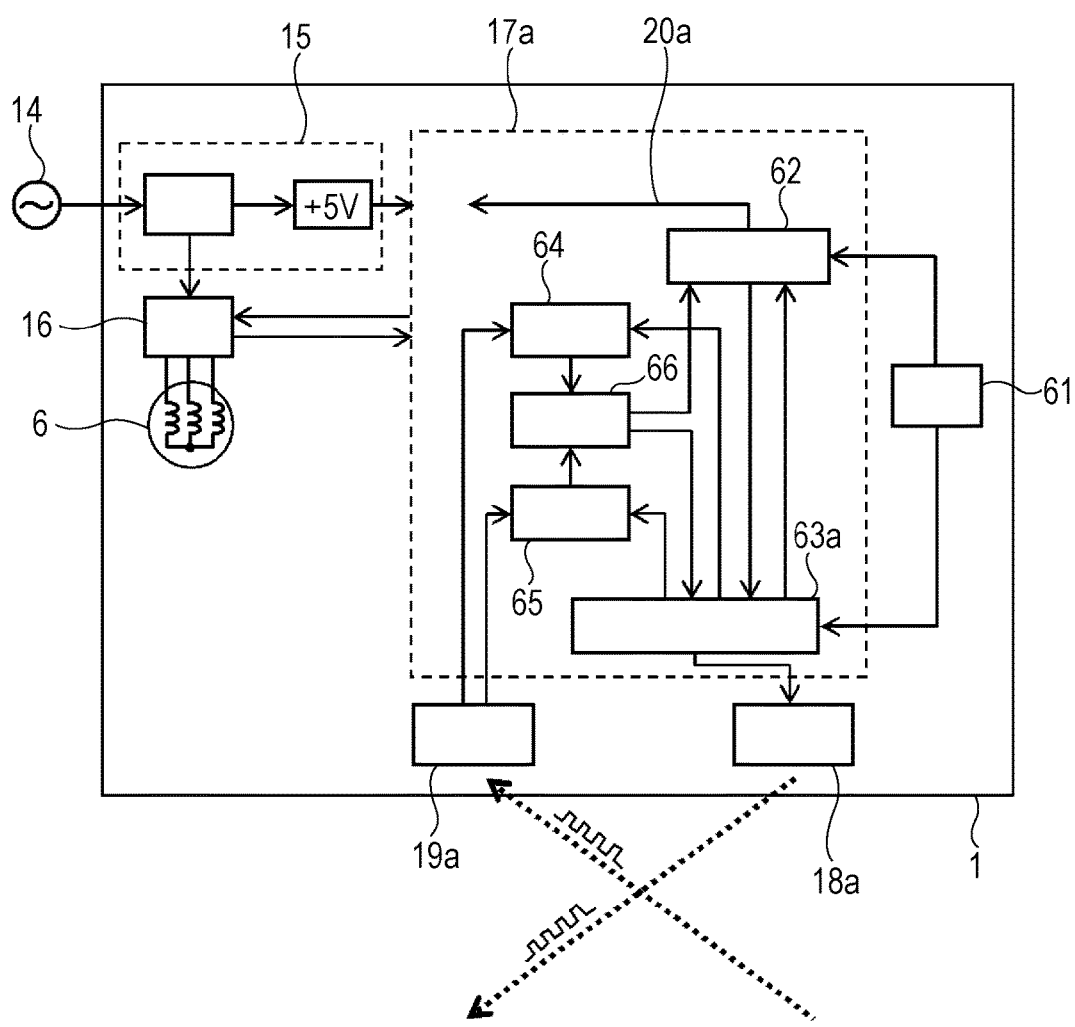
FIG. 20 is a control block diagram of the ventilation apparatus.

Next, the block diagram of a control circuit of first ventilation apparatus 51 is described with reference to FIG. 20. FIG. 20 is a control block diagram of the ventilation apparatus which constitutes the ventilation system of the fifth exemplary embodiment of the present invention.

First control part 17a transmits first air volume incremental or decremental value $\Delta q(1)$ to second ventilation apparatus 52 and third ventilation apparatus 53 through first information transmission part 18a. First air volume incremental or decremental value $\Delta q(1)$ is described later. First control part 17a acquires second air volume incremental or decremental value $\Delta q(2)$ of second ventilation apparatus 52 and third air volume incremental or decremental value $\Delta q(3)$ of third ventilation apparatus 53 through first information reception part 19a.

Air volume control part 62 drives drive IC 16 based on air volume instruction value $qx$ obtained by adding first air volume incremental or decremental value $\Delta q(1)$ to set air volume value $q(1)$ which is a ventilation air volume of first ventilation apparatus 51 set by air volume setting part 61.

$$qx=q(1)+\Delta q(1)$$

Due to the characteristic of drive IC 16, a ventilation air volume of first ventilation apparatus 51 is controlled at a fixed value provided that the ventilation air volume falls within a range from the maximum ventilation air volume capacity to the lowest ventilation air volume capacity.

First air volume difference calculation part 63a calculates an air volume difference which is a difference between set air volume value $q(1)$ set by air volume setting part 61 and current air volume value $q_R(1)$ controlled by air volume control part 62. First air volume incremental or decremental value $\Delta q(1)$ is decided by adding correction air volume value $qm$ of first ventilation apparatus 51 described later to the air volume difference.

$$\Delta q(1)=q(1)-q_R(1)+qm$$

That is, first air volume incremental or decremental value Δq(1) is calculated based on excess or deficiency of the air volume in first ventilation apparatus 51, second ventilation apparatus 52 and third ventilation apparatus 53. On the other hand, first decision part 64 shown in FIG. 20 calculates sum ΣΔq(n) of second air volume incremental or decremental value Δq(2) of second ventilation apparatus 52 and third air volume incremental or decremental value Δq(3) of third ventilation apparatus 53 which are received by first information reception part 19a and first air volume incremental or decremental value Δq(1) decided by first air volume difference calculation part 63a.

$$\Sigma\Delta q(n)=\Delta q(1)+\Delta q(2)+$$

When sum ΣΔq(n) is not ±0 [m³/h], sum adjustment value qa which is a minimum unit air volume and by which sum ΣΔq(n) is made to approximate ±0 [m³/h] is calculated, and third decision part 66 is informed of sum adjustment value qa. When sum ΣΔq(n) is ±0 [m³/h], it is determined that the air volume is balanced, and third decision part 66 is informed of this fact.

Sum adjustment value qa which is output as a plus value when sum ΣΔq(n) is a positive value, and sum adjustment value qa is output as a minus value when sum ΣΔq(n) is a negative value. That is, first decision part 64 outputs sum adjustment value qa which is a plus value when the whole total ventilation air volume is in excess. On the other hand, first decision part 64 outputs sum adjustment value qa which is a minus value when the whole total ventilation air volume is deficient.

Although an absolute value of sum adjustment value qa becomes a minimum unit used in addition or subtraction when a total ventilation air volume converges to a target value, the absolute value of sum adjustment value qa is adjusted depending on an accuracy of air volume which the ventilation apparatus aims at or intervals that the processing is performed.

In this exemplary embodiment, sum adjustment value qa is output when sum ΣΔq(n) is not ±0 [m³/h]. However, it may be determined that an air volume is balanced when sum ΣΔq(n) falls within a predetermined range with respect to ±0 [m³/h], and sum adjustment value qa may be output when sum ΣΔq(n) goes beyond the range.

Second decision part 65 shown in FIG. 20 compares first air volume incremental or decremental value Δq(1), second air volume incremental or decremental value Δq(2) and third air volume incremental or decremental value Δq(3) with each other, calculates irregularity adjusting value qb which is an minimum unit of an air volume value in reducing the difference between air volume incremental or decremental values, and informs third decision part 66 shown in FIG. 20 of irregularity adjusting value qb.

That is, second decision part 65 compares first air volume incremental or decremental value Δq(1), second air volume incremental or decremental value Δq(2) and third air volume incremental or decremental value Δq(3) with air volume incremental or decremental value average value AVE(Δq(n)). When first air volume incremental or decremental value Δq(n) is larger than air volume incremental or decremental value average value AVE(Δq(n)) (Δq(n)>AVE(Δq(n))), irregularity adjusting value qb which is a plus value is output. To the contrary, first air volume incremental or decremental value Δq(n) is smaller than air volume incremental or decremental value average value AVE(Δq(n)) (Δq(n)<AVE(Δq(n))), irregularity adjusting value qb which is a minus value is output. In this manner, a control is performed such that a sum of deviations becomes minimum with respect to the air volume incremental or decremental values.

That is, second decision part 65 determines whether or not a difference between air volumes output from first ventilation apparatus 51, second ventilation apparatus 52 and third ventilation apparatus 53 is large.

When the whole air volume is balanced with a total ventilation air volume, that is, when ΣΔq(n) is ±0, third decision part 66 sets irregularity adjusting value qb as correction air volume value qm and outputs irregularity adjusting value qb. When the whole air volume is not balanced with the total ventilation air volume, that is, an air volume is in excess or deficient, third decision part 66 sets sum adjustment value qa as correction air volume value qm and outputs sum adjustment value qa. As described previously, correction air volume value qm is transmitted to first air volume difference calculation part 63a.

In the fifth exemplary embodiment, the case where three ventilation apparatuses are used is described. However, even when the number of ventilation apparatuses is increased to four or more, and even when a set air volumes differ from each other, substantially the same advantageous effect can be acquired. That is, first control part 17a includes: first-ventilation-apparatus air volume setting part 61a; first-ventilation-apparatus air volume control part 62a; and first air volume difference calculation part 63a. In this exemplary embodiment, first-ventilation-apparatus air volume setting part 61a sets a first-ventilation-apparatus set air volume of first ventilation apparatus 1. First-ventilation-apparatus air volume control part 62a sets a value obtained by adding a first air volume incremental or decremental value to a first-ventilation-apparatus set air volume. First air volume difference calculation part 63a detects a first-ventilation-apparatus output air volume which first ventilation apparatus 1 actually outputs, and sets a value obtained by adding a first correction air volume value to a difference between a first-ventilation-apparatus output air volume and a first-ventilation-apparatus set air volume as a first air volume incremental or decremental value.

mth control part 17m where m is an integer which satisfies 2≤m≤n includes: mth-ventilation-apparatus air volume setting part 61m; mth-ventilation-apparatus air volume control part 62m; and mth-ventilation-apparatus air volume difference calculation part 63m. In this exemplary embodiment, mth-ventilation-apparatus air volume setting part 61m sets an mth-ventilation-apparatus set air volume of mth ventilation apparatus M. mth-ventilation-apparatus air volume control part 62m sets a value obtained by adding an mth air volume incremental or decremental value to an mth-ventilation-apparatus set air volume. mth-ventilation-apparatus air volume difference calculation part 63m detects an mth-ventilation-apparatus output air volume which mth ventilation apparatus M actually outputs, and sets a value obtained by adding an mth correction air volume value to a difference between the mth-ventilation-apparatus output air volume and the mth-ventilation-apparatus set air volume as an mth air volume incremental or decremental value.

Ventilation-apparatus air volume control parts ranging from first-ventilation-apparatus air volume control part 62a to nth-ventilation-apparatus air volume control part 62n are controlled such that a sum from a first air volume incremental or decremental value to an nth air volume incremental or decremental value becomes 0.

Further, the ventilation-apparatus air volume control parts ranging from first-ventilation-apparatus air volume control part 62a to the nth-ventilation-apparatus air volume control part (62n) may be controlled such that, in place of a sum from a first air volume incremental or decremental value to an nth air volume incremental or decremental value, a sum of deviations becomes minimum with respect to air volume incremental or decremental values.

As has been described above, in the fifth exemplary embodiment of the present invention, the respective ventilation apparatuses mutually acquire information from each other so that the ventilation apparatus determines its own ventilation air volume based on an air volume incremental or decremental value of its own ventilation apparatus and air volume incremental or decremental values of other ventilation apparatuses, and the respective ventilation apparatuses are operated with their determined own ventilation air volumes. Accordingly, even when ventilation capacities of the respective ventilation apparatus are in excess with respect to the total ventilation air volume necessary for whole house 30, the adjustment can be performed such that the ventilation apparatuses reduce their own air volumes. With such configuration, the air volume of whole house 30 can be maintained at an optimum value.

INDUSTRIAL APPLICABILITY

As has been described above, in the present invention, ventilation apparatuses constitute a network and hence, the present invention can provide an optimum air volume necessary for building whereby the present invention is applicable to fields such as an office, a shop and the like in addition to a household.

REFERENCE MARKS IN THE DRAWINGS 1, 51 first ventilation apparatus
2, 52 second ventilation apparatus
3 body case
4 indoor air intake opening portion
5 indoor air discharge opening portion
6 blower
7 ceiling plate
8 duct
9 ventilation hole
10 decorative plate
11 mounting spring
12 mounting portion
13 temporary total ventilation air volume setting part
13a first temporary total ventilation air volume setting part
13b second temporary total ventilation air volume setting part
14 commercial power source
15 power source circuit
16 drive IC
17a first control part
17m mth control part
18 information transmission part
18a first information transmission part
18b second information transmission part
18m mth information transmission part
19 information reception part
19a first information reception part
19b second information reception part
19c third information reception part
19m mth information reception part
20 total ventilation air volume determination part
20a first total ventilation air volume determination part
20b second total ventilation air volume determination part
20c third total ventilation air volume determination part
20m mth total ventilation air volume determination part
21 first air volume decision part
21a first-ventilation-apparatus first air volume decision part
21b second-ventilation-apparatus first air volume decision part
21m mth-ventilation-apparatus first air volume decision part
22a first air volume detection part
22b second air volume detection part
22m mth air volume detection part
23 calculation buffer
24 outside air volume setting part
24a first outside air volume setting part
24b second outside air volume setting part
24m mth outside air volume setting part
25 outside air volume setting part mounting hole
26 second air volume decision part
26a first-ventilation-apparatus second air volume decision part
26b second-ventilation-apparatus second air volume decision part
26m mth-ventilation-apparatus second air volume decision part
27 human sensor
28 third air volume decision part
30 house
31 information transmission network
53 third ventilation apparatus
54 floor area setting part
55 area setting part
55a first area setting part
55m mth area setting part
61 air volume setting part
61a first-ventilation-apparatus air volume setting part
61m mth-ventilation-apparatus air volume setting part
62 air volume control part
62a first-ventilation-apparatus air volume control part
62m mth-ventilation-apparatus air volume control part
62n nth-ventilation-apparatus air volume control part
63a first air volume difference calculation part
63m mth-ventilation-apparatus air volume difference calculation part
64 first decision part
65 second decision part
66 third decision part

The invention claimed is:

1. A ventilation apparatus installed inside a house, and constituting a ventilation system with other ventilation apparatuses connected through a single system of information transmission network for maintaining a ventilation air volume in the house constant, wherein the ventilation system comprises n sets of the ventilation apparatuses designated as a first ventilation apparatus to an nth ventilation apparatus where n is an integer of 2 or more, the first ventilation apparatus comprises:

a first information transmission part configured to transmit information to the second ventilation apparatus to the nth ventilation apparatus through the information transmission network;

a first information reception part configured to receive information on the second ventilation apparatus to the nth ventilation apparatus through the information transmission network; and a first control part configured to decide operation of the first ventilation apparatus, the first control part comprises:
  a first total ventilation air volume determination part configured to determine a total ventilation air volume necessary for the house;
  a first-ventilation-apparatus first air volume decision part configured to decide a first-ventilation-apparatus target air volume necessary for maintaining the total ventilation air volume based on the information on the second ventilation apparatus to the nth ventilation apparatus received by the first information reception part; and
  a first air volume detection part configured to detect a first-ventilation-apparatus output air volume which the first ventilation apparatus actually outputs, and, when the first-ventilation-apparatus output air volume differs from the first-ventilation-apparatus target air volume, inform the second ventilation apparatus to the nth ventilation apparatus of the first-ventilation-apparatus output air volume as a preferential air volume, through the first information transmission part,
the mth ventilation apparatus, where m is any of integers that satisfy $2 \leq m \leq n$, comprises:
  an mth information transmission part configured to transmit information to the first ventilation apparatus to the (m−1)th ventilation apparatus and the (m+1)th ventilation apparatus to the nth ventilation apparatus through the information transmission network;
  an mth information reception part configured to receive information on the first ventilation apparatus to the (m−1)th ventilation apparatus and the (m+1)th ventilation apparatus to the nth ventilation apparatus through the information transmission network; and
  an mth control part configured to decide operation of the mth ventilation apparatus,
the mth control part comprises:
  an mth total ventilation air volume determination part configured to determine the total ventilation air volume;
  an mth-ventilation-apparatus first air volume decision part configured to decide an mth-ventilation-apparatus target air volume necessary for maintaining the total ventilation air volume based on the information on the first ventilation apparatus to the (m−1)th ventilation apparatus and the (m+1)th ventilation apparatus to the nth ventilation apparatus received by the mth information reception part; and
  an mth air volume detection part configured to detects an mth-ventilation-apparatus output air volume which the mth ventilation apparatus actually outputs, and, when the mth-ventilation-apparatus output air volume differs from the mth-ventilation-apparatus target air volume, inform the first ventilation apparatus to the (m−1)th ventilation apparatus and the (m+1)th ventilation apparatus to the nth ventilation apparatus of the mth-ventilation-apparatus output air volume as a preferential air volume, through the mth information transmission part,
each of the first ventilation apparatus and the mth ventilation apparatus further comprises a floor area setting part which sets a total floor area of the house,
each of the first information transmission part and the mth information transmission part transmits information on the set total floor area, the first information reception part receives information on the total floor area set in the mth ventilation apparatus,
the mth information reception part receives information on the total floor area set in the first ventilation apparatus to the (m−1)th ventilation apparatus and the (m+1)th ventilation apparatus to the nth ventilation apparatus, and
each of the first total ventilation air volume determination part and the mth total ventilation air volume determination part calculates the total ventilation air volume based on a largest one of the total floor areas.

2. A ventilation apparatus installed inside a house, and constituting a ventilation system with other ventilation apparatuses connected through a single system of information transmission network for maintaining a ventilation air volume in the house constant,
wherein
the ventilation system comprises n sets of the ventilation apparatuses designated as a first ventilation apparatus to an nth ventilation apparatus where n is an integer of 2 or more,
the first ventilation apparatus comprises:
  a first information transmission part configured to transmit information to the second ventilation apparatus to the nth ventilation apparatus through the information transmission network;
  a first information reception part configured to receive information on the second ventilation apparatus to the nth ventilation apparatus through the information transmission network; and
  a first control part configured to decide operation of the first ventilation apparatus, the first control part comprises:
    a first total ventilation air volume determination part configured to determine a total ventilation air volume necessary for the house;
    a first-ventilation-apparatus first air volume decision part configured to decide a first-ventilation-apparatus target air volume necessary for maintaining the total ventilation air volume based on the information on the second ventilation apparatus to the nth ventilation apparatus received by the first information reception part; and
    a first air volume detection part configured to detect a first-ventilation-apparatus output air volume which the first ventilation apparatus actually outputs, and, when the first-ventilation-apparatus output air volume differs from the first-ventilation-apparatus target air volume, inform the second ventilation apparatus to the nth ventilation apparatus of the first-ventilation-apparatus output air volume as a preferential air volume, through the first information transmission part,
the mth ventilation apparatus, where m is any of integers that satisfy $2 \leq m \leq n$, comprises:
  an mth information transmission part configured to transmit information to the first ventilation apparatus to the (m−1)th ventilation apparatus and the (m+1)th ventilation apparatus to the nth ventilation apparatus through the information transmission network;
  an mth information reception part configured to receive information on the first ventilation apparatus to the (m−1)th ventilation apparatus and the (m+1)th ventilation apparatus to the nth ventilation apparatus through the information transmission network; and an mth control part configured to decide operation of the mth ventilation apparatus, the mth control part comprises:

an mth total ventilation air volume determination part configured to determine the total ventilation air volume;

an mth-ventilation-apparatus first air volume decision part configured to decide an mth-ventilation-apparatus target air volume necessary for maintaining the total ventilation air volume based on the information on the first ventilation apparatus to the (m−1)th ventilation apparatus and the (m+1)th ventilation apparatus to the nth ventilation apparatus received by the mth information reception part; and an mth air volume detection part configured to detects an mth-ventilation-apparatus output air volume which the mth ventilation apparatus actually outputs, and, when the mth-ventilation-apparatus output air volume differs from the mth-ventilation-apparatus target air volume, inform the first ventilation apparatus to the (m−1)th ventilation apparatus and the (m+1)th ventilation apparatus to the nth ventilation apparatus of the mth-ventilation-apparatus output air volume as a preferential air volume, through the mth information transmission part, each of the first ventilation apparatus and the mth ventilation apparatus further comprises a temporary total ventilation air volume setting part configured to set a temporary total ventilation air volume of the house, the first information transmission part transmits the temporary total ventilation air volume to the second ventilation apparatus and the mth ventilation apparatus as transmission information, the mth information transmission part transmits the temporary total ventilation air volume to the first ventilation apparatus to the (m−1)th ventilation apparatus and the (m+1)th ventilation apparatus to the nth ventilation apparatus as transmission information, the first total ventilation air volume determination part determines a largest one of the temporary total ventilation air volumes acquired through the first information reception part as the total ventilation air volume necessary for the house, and the mth total ventilation air volume determination part determines a largest one of the temporary total ventilation air volumes acquired through the mth information reception part as the total ventilation air volume necessary for the house.

3. A ventilation apparatus installed inside a house, and constituting a ventilation system with other ventilation apparatuses connected through a single system of information transmission network for maintaining a ventilation air volume in the house constant, wherein the ventilation system comprises n sets of the ventilation apparatuses designated as a first ventilation apparatus to an nth ventilation apparatus where n is an integer of 2 or more, the first ventilation apparatus comprises:

a first information transmission part configured to transmit information to the second ventilation apparatus to the nth ventilation apparatus through the information transmission network;

a first information reception part configured to receive information on the second ventilation apparatus to the nth ventilation apparatus through the information transmission network; and a first control part configured to decide operation of the first ventilation apparatus, the first control part comprises:

a first total ventilation air volume determination part configured to determine a total ventilation air volume necessary for the house;

a first-ventilation-apparatus first air volume decision part configured to decide a first-ventilation-apparatus target air volume necessary for maintaining the total ventilation air volume based on the information on the second ventilation apparatus to the nth ventilation apparatus received by the first information reception part; and a first air volume detection part configured to detect a first-ventilation-apparatus output air volume which the first ventilation apparatus actually outputs, and, when the first-ventilation-apparatus output air volume differs from the first-ventilation-apparatus target air volume, inform the second ventilation apparatus to the nth ventilation apparatus of the first-ventilation-apparatus output air volume as a preferential air volume, through the first information transmission part, the mth ventilation apparatus, where m is any of integers that satisfy 2≤m≤n, comprises:

an mth information transmission part configured to transmit information to the first ventilation apparatus to the (m−1)th ventilation apparatus and the (m+1)th ventilation apparatus to the nth ventilation apparatus through the information transmission network;

an mth information reception part configured to receive information on the first ventilation apparatus to the (m−1)th ventilation apparatus and the (m+1)th ventilation apparatus to the nth ventilation apparatus through the information transmission network; and an mth control part configured to decide operation of the mth ventilation apparatus, the mth control part comprises:

an mth total ventilation air volume determination part configured to determine the total ventilation air volume;

an mth-ventilation-apparatus first air volume decision part configured to decide an mth-ventilation-apparatus target air volume necessary for maintaining the total ventilation air volume based on the information on the first ventilation apparatus to the (m−1)th ventilation apparatus and the (m+1)th ventilation apparatus to the nth ventilation apparatus received by the mth information reception part; and an mth air volume detection part configured to detects an mth-ventilation-apparatus output air volume which the mth ventilation apparatus actually outputs, and, when the mth-ventilation-apparatus output air volume differs from the mth-ventilation-apparatus target air volume, inform the first ventilation apparatus to the (m−1)th ventilation apparatus and the (m+1)th ventilation apparatus to the nth ventilation apparatus of the mth-ventilation-apparatus output air volume as a preferential air volume, through the mth information transmission part, the first ventilation apparatus and the mth ventilation apparatus respectively store a first prescribed air volume and an mth prescribed air volume acquired when the first ventilation apparatus and the mth ventilation apparatus are operated with maximum capacities, the first-ventilation-apparatus first air volume decision part sets an air volume acquired by multiplying the total ventilation air volume by a ratio of the first prescribed air volume as the first-ventilation-apparatus target air volume, and the mth-ventilation-apparatus first air volume decision part sets an air volume acquired by multiplying the total ventilation air volume by a ratio of the mth prescribed air volume as the mth-ventilation-apparatus target air volume.

4. A ventilation apparatus installed inside a house, and constituting a ventilation system with other ventilation apparatuses connected through a single system of information transmission network for maintaining a ventilation air volume in the house constant, wherein the ventilation system comprises n sets of the ventilation apparatuses designated as a first ventilation apparatus to an nth ventilation apparatus where n is an integer of 2 or more, the first ventilation apparatus comprises:
    a first information transmission part configured to transmit information to the second ventilation apparatus to the nth ventilation apparatus through the information transmission network;
    a first information reception part configured to receive information on the second ventilation apparatus to the nth ventilation apparatus through the information transmission network; and
    a first control part configured to decide operation of the first ventilation apparatus, the first control part comprises:
    a first total ventilation air volume determination part configured to determine a total ventilation air volume necessary for the house;
    a first-ventilation-apparatus first air volume decision part configured to decide a first-ventilation-apparatus target air volume necessary for maintaining the total ventilation air volume based on the information on the second ventilation apparatus to the nth ventilation apparatus received by the first information reception part; and
    a first air volume detection part configured to detect a first-ventilation-apparatus output air volume which the first ventilation apparatus actually outputs, and, when the first-ventilation-apparatus output air volume differs from the first-ventilation-apparatus target air volume, inform the second ventilation apparatus to the nth ventilation apparatus of the first-ventilation-apparatus output air volume as a preferential air volume, through the first information transmission part, the mth ventilation apparatus, where m is any of integers that satisfy $2 \leq m \leq n$, comprises:
    an mth information transmission part configured to transmit information to the first ventilation apparatus to the (m−1)th ventilation apparatus and the (m+1)th ventilation apparatus to the nth ventilation apparatus through the information transmission network;
    an mth information reception part configured to receive information on the first ventilation apparatus to the (m−1)th ventilation apparatus and the (m+1)th ventilation apparatus to the nth ventilation apparatus through the information transmission network; and
    an mth control part configured to decide operation of the mth ventilation apparatus, the mth control part comprises:
    an mth total ventilation air volume determination part configured to determine the total ventilation air volume;
    an mth-ventilation-apparatus first air volume decision part configured to decide an mth-ventilation-apparatus target air volume necessary for maintaining the total ventilation air volume based on the information on the first ventilation apparatus to the (m−1)th ventilation apparatus and the (m+1)th ventilation apparatus to the nth ventilation apparatus received by the mth information reception part; and
    an mth air volume detection part configured to detects an mth-ventilation-apparatus output air volume which the mth ventilation apparatus actually outputs, and, when the mth-ventilation-apparatus output air volume differs from the mth-ventilation-apparatus target air volume, inform the first ventilation apparatus to the (m−1)th ventilation apparatus and the (m+1)th ventilation apparatus to the nth ventilation apparatus of the mth-ventilation-apparatus output air volume as a preferential air volume, through the mth information transmission part, the first ventilation apparatus and the mth ventilation apparatus respectively store a first prescribed air volume and an mth prescribed air volume acquired when the first ventilation apparatus and the mth ventilation apparatus are operated with maximum capacities, the first information transmission part transmits information on the first prescribed air volume, the first information reception part receives information on the mth prescribed air volume, the first total ventilation air volume determination part sets a sum of the mth prescribed air volume and the first prescribed air volume as the total ventilation air volume, the mth information transmission part transmits information on the mth prescribed air volume, the mth information reception part receives information on the first prescribed air volume to an (m−1)th prescribed air volume and an (m+1)th prescribed air volume to an nth prescribed air volume, and the mth total ventilation air volume determination part sets a sum of the mth prescribed air volume and the first prescribed air volume as the total ventilation air volume.

5. A ventilation apparatus installed inside a house, and constituting a ventilation system with other ventilation apparatuses connected through a single system of information transmission network for maintaining a ventilation air volume in the house constant, wherein the ventilation system comprises n sets of the ventilation apparatuses designated as a first ventilation apparatus to an nth ventilation apparatus where n is an integer of 2 or more, the first ventilation apparatus comprises:
    a first information transmission part configured to transmit information to the second ventilation apparatus to the nth ventilation apparatus through the information transmission network;
    a first information reception part configured to receive information on the second ventilation apparatus to the nth ventilation apparatus through the information transmission network; and
    a first control part configured to decide operation of the first ventilation apparatus, the first control part comprises:

a first total ventilation air volume determination part configured to determine a total ventilation air volume necessary for the house;

a first-ventilation-apparatus first air volume decision part configured to decide a first-ventilation-apparatus target air volume necessary for maintaining the total ventilation air volume based on the information on the second ventilation apparatus to the nth ventilation apparatus received by the first information reception part; and a first air volume detection part configured to detect a first-ventilation-apparatus output air volume which the first ventilation apparatus actually outputs, and, when the first-ventilation-apparatus output air volume differs from the first-ventilation-apparatus target air volume, inform the second ventilation apparatus to the nth ventilation apparatus of the first-ventilation-apparatus output air volume as a preferential air volume, through the first information transmission part, the mth ventilation apparatus, where m is any of integers that satisfy 2≤m≤n, comprises:

an mth information transmission part configured to transmit information to the first ventilation apparatus to the (m−1)th ventilation apparatus and the (m+1)th ventilation apparatus to the nth ventilation apparatus through the information transmission network;

an mth information reception part configured to receive information on the first ventilation apparatus to the (m−1)th ventilation apparatus and the (m+1)th ventilation apparatus to the nth ventilation apparatus through the information transmission network; and an mth control part configured to decide operation of the mth ventilation apparatus, the mth control part comprises:

an mth total ventilation air volume determination part configured to determine the total ventilation air volume;

an mth-ventilation-apparatus first air volume decision part configured to decide an mth-ventilation-apparatus target air volume necessary for maintaining the total ventilation air volume based on the information on the first ventilation apparatus to the (m−1)th ventilation apparatus and the (m+1)th ventilation apparatus to the nth ventilation apparatus received by the mth information reception part; and an mth air volume detection part configured to detects an mth-ventilation-apparatus output air volume which the mth ventilation apparatus actually outputs, and, when the mth-ventilation-apparatus output air volume differs from the mth-ventilation-apparatus target air volume, inform the first ventilation apparatus to the (m−1)th ventilation apparatus and the (m+1)th ventilation apparatus to the nth ventilation apparatus of the mth-ventilation-apparatus output air volume as a preferential air volume, through the mth information transmission part, the first control part further comprises a first outside air volume setting part which sets an air volume having priority over the first-ventilation-apparatus target air volume, the mth control part further comprises an mth outside air volume setting part which sets an air volume having priority over the mth-ventilation-apparatus target air volume, the first control part comprises a first-ventilation-apparatus second air volume decision part which informs the second ventilation apparatus and the mth ventilation apparatus of an operation air volume set by the first outside air volume setting part as a preferential air volume, through the first information transmission part, and the mth control part comprises an mth-ventilation-apparatus second air volume decision part which informs the first ventilation apparatus to the (m−1)th ventilation apparatus and the (m+1)th ventilation apparatus to the nth ventilation apparatus of an operation air volume set by the mth outside air volume setting part as a preferential air volume, through the mth information transmission part.

6. A ventilation apparatus installed inside a house, and constituting a ventilation system with other ventilation apparatuses connected through a single system of information transmission network for maintaining a ventilation air volume in the house constant, wherein the ventilation system comprises n sets of the ventilation apparatuses designated as a first ventilation apparatus to an nth ventilation apparatus where n is an integer of 2 or more, the first ventilation apparatus comprises:

a first information transmission part configured to transmit information to the second ventilation apparatus to the nth ventilation apparatus through the information transmission network;

a first information reception part configured to receive information on the second ventilation apparatus to the nth ventilation apparatus through the information transmission network; and a first control part configured to decide operation of the first ventilation apparatus, the first control part comprises:

a first total ventilation air volume determination part configured to determine a total ventilation air volume necessary for the house;

a first-ventilation-apparatus first air volume decision part configured to decide a first-ventilation-apparatus target air volume necessary for maintaining the total ventilation air volume based on the information on the second ventilation apparatus to the nth ventilation apparatus received by the first information reception part; and a first air volume detection part configured to detect a first-ventilation-apparatus output air volume which the first ventilation apparatus actually outputs, and, when the first-ventilation-apparatus output air volume differs from the first-ventilation-apparatus target air volume, inform the second ventilation apparatus to the nth ventilation apparatus of the first-ventilation-apparatus output air volume as a preferential air volume, through the first information transmission part, the mth ventilation apparatus, where m is any of integers that satisfy 2≤m≤n, comprises:

an mth information transmission part configured to transmit information to the first ventilation apparatus to the (m−1)th ventilation apparatus and the (m+1)th ventilation apparatus to the nth ventilation apparatus through the information transmission network;

an mth information reception part configured to receive information on the first ventilation apparatus to the (m−1)th ventilation apparatus and the (m+1)th ventilation apparatus to the nth ventilation apparatus through the information transmission network; and an mth control part configured to decide operation of the mth ventilation apparatus, the mth control part comprises:
- an mth total ventilation air volume determination part configured to determine the total ventilation air volume;
- an mth-ventilation-apparatus first air volume decision part configured to decide an mth-ventilation-apparatus target air volume necessary for maintaining the total ventilation air volume based on the information on the first ventilation apparatus to the (m−1)th ventilation apparatus and the (m+1)th ventilation apparatus to the nth ventilation apparatus received by the mth information reception part; and
- an mth air volume detection part configured to detects an mth-ventilation-apparatus output air volume which the mth ventilation apparatus actually outputs, and, when the mth-ventilation-apparatus output air volume differs from the mth-ventilation-apparatus target air volume, inform the first ventilation apparatus to the (m−1)th ventilation apparatus and the (m+1)th ventilation apparatus to the nth ventilation apparatus of the mth-ventilation-apparatus output air volume as a preferential air volume, through the mth information transmission part, the first ventilation apparatus comprises a first area setting part configured to set a place where the first ventilation apparatus is installed, and the mth ventilation apparatus comprises an mth area setting part configured to set a place where the mth ventilation apparatus is installed, and the first total ventilation air volume determination part and the mth total ventilation air volume determination part determine the total ventilation air volume for each of area information set respectively by the first area setting part and the mth area setting part.

* * * * *